United States Patent
Takada et al.

(10) Patent No.: US 8,266,342 B1
(45) Date of Patent: Sep. 11, 2012

(54) STORAGE SYSTEM

(75) Inventors: Masanori Takada, Yokohama (JP);
Hiroshi Hirayama, Yokohama (JP);
Akira Yamamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/143,692

(22) PCT Filed: Jun. 24, 2011

(86) PCT No.: PCT/JP2011/003624
§ 371 (c)(1),
(2), (4) Date: Jul. 7, 2011

(51) Int. Cl.
*G06F 13/00* (2006.01)
(52) U.S. Cl. .......................... 710/33; 345/537
(58) Field of Classification Search ............ 710/33
See application file for complete search history.

(56) References Cited

U.S. PATENT DOCUMENTS

| | | | | |
|---|---|---|---|---|
| 5,901,324 | A * | 5/1999 | Ogi | 712/28 |
| 7,684,422 | B1 * | 3/2010 | Sindhu et al. | 370/412 |
| 2005/0097273 | A1 | 5/2005 | Kanai | |
| 2007/0081539 | A1 * | 4/2007 | Shaikli | 370/394 |
| 2007/0201434 | A1 * | 8/2007 | Nakamura et al. | 370/352 |
| 2008/0065841 | A1 * | 3/2008 | Lee | 711/154 |

FOREIGN PATENT DOCUMENTS

| | | |
|---|---|---|
| JP | 2007-219717 | 8/2007 |
| WO | WO 2007/005702 A2 | 1/2007 |
| WO | WO 2007/050444 A2 | 5/2007 |

OTHER PUBLICATIONS

Dufrasne, Bertrand, et al.; IBM System Storage DS8700 Architecture and Implementation; Aug. 2010; 630 pages; IBM International Technical Support Organization, SG24-8786-01.
PCT International Search Report and Written Opinion on application PCT/JP2011/003624 mailed Feb. 8, 2012; 11 pages.

* cited by examiner

*Primary Examiner* — Elias Mamo
(74) *Attorney, Agent, or Firm* — Foley & Lardner LLP

(57) ABSTRACT

A storage system of an embodiment of this invention comprises a first transfer engine, a second transfer engine, a first storage device, a second storage device, a processor, and a transfer sequencer which is a device different from the processor. The processor creates transfer sequence information for indicating a sequence of transfers of user data. The transfer sequencer receives the transfer sequence information made by the processor and controls the first and the second transfer engines in accordance with the transfer sequence information. The first and the second transfer engines transfer user data between storage devices in accordance with instructions from the transfer sequencer.

12 Claims, 30 Drawing Sheets

[Fig. 1]
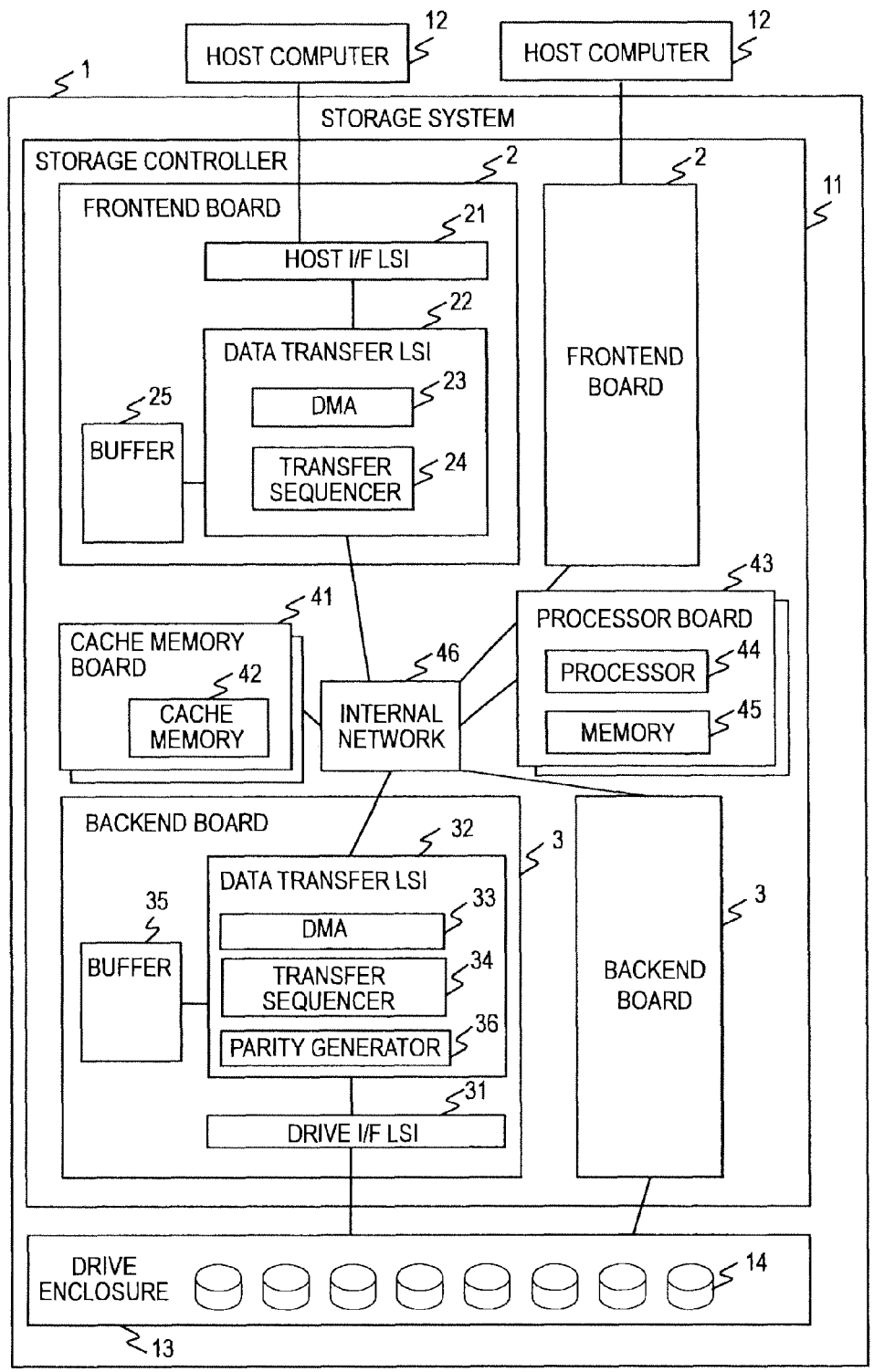

[Fig. 2]
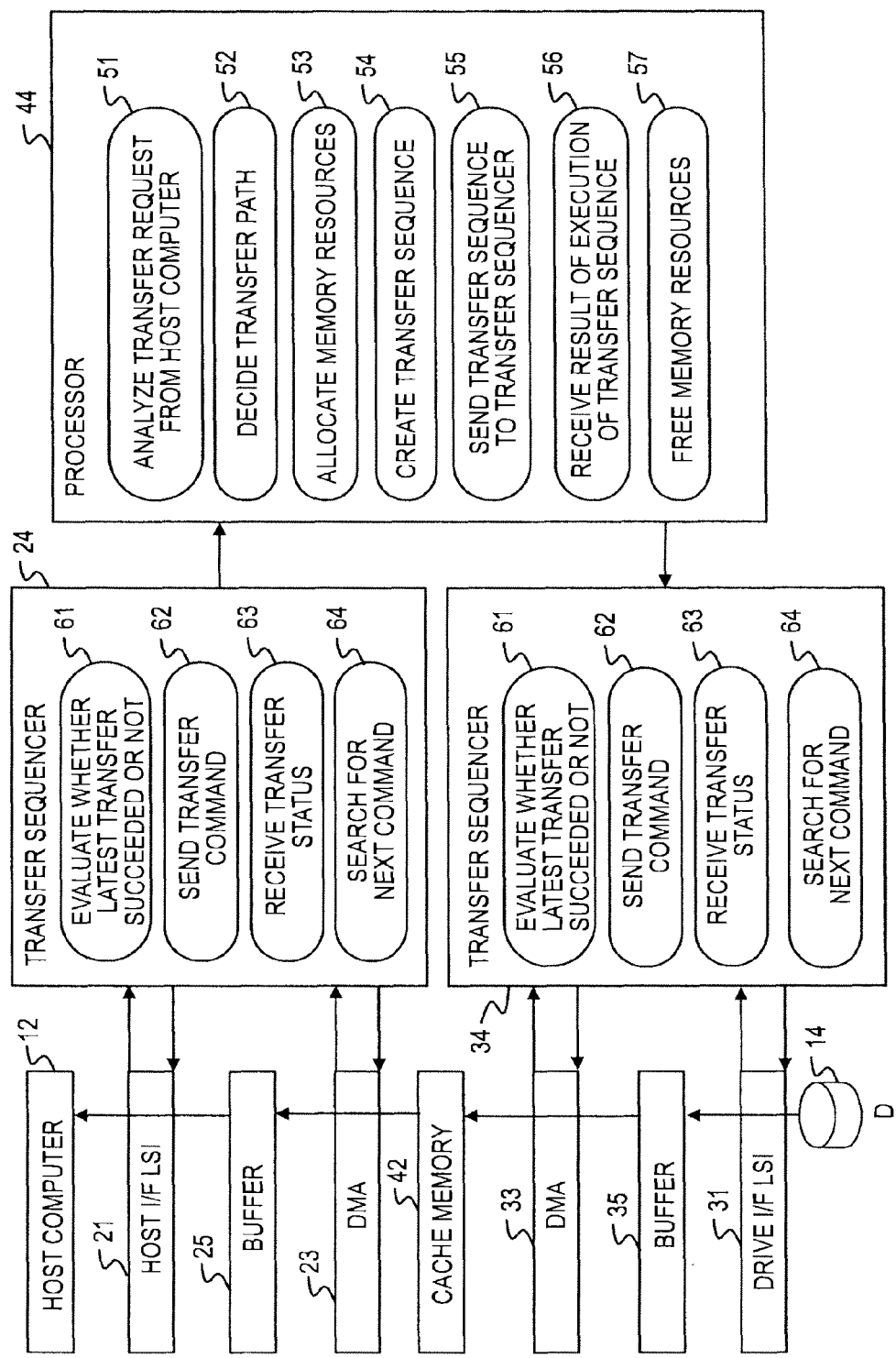

[Fig. 3]
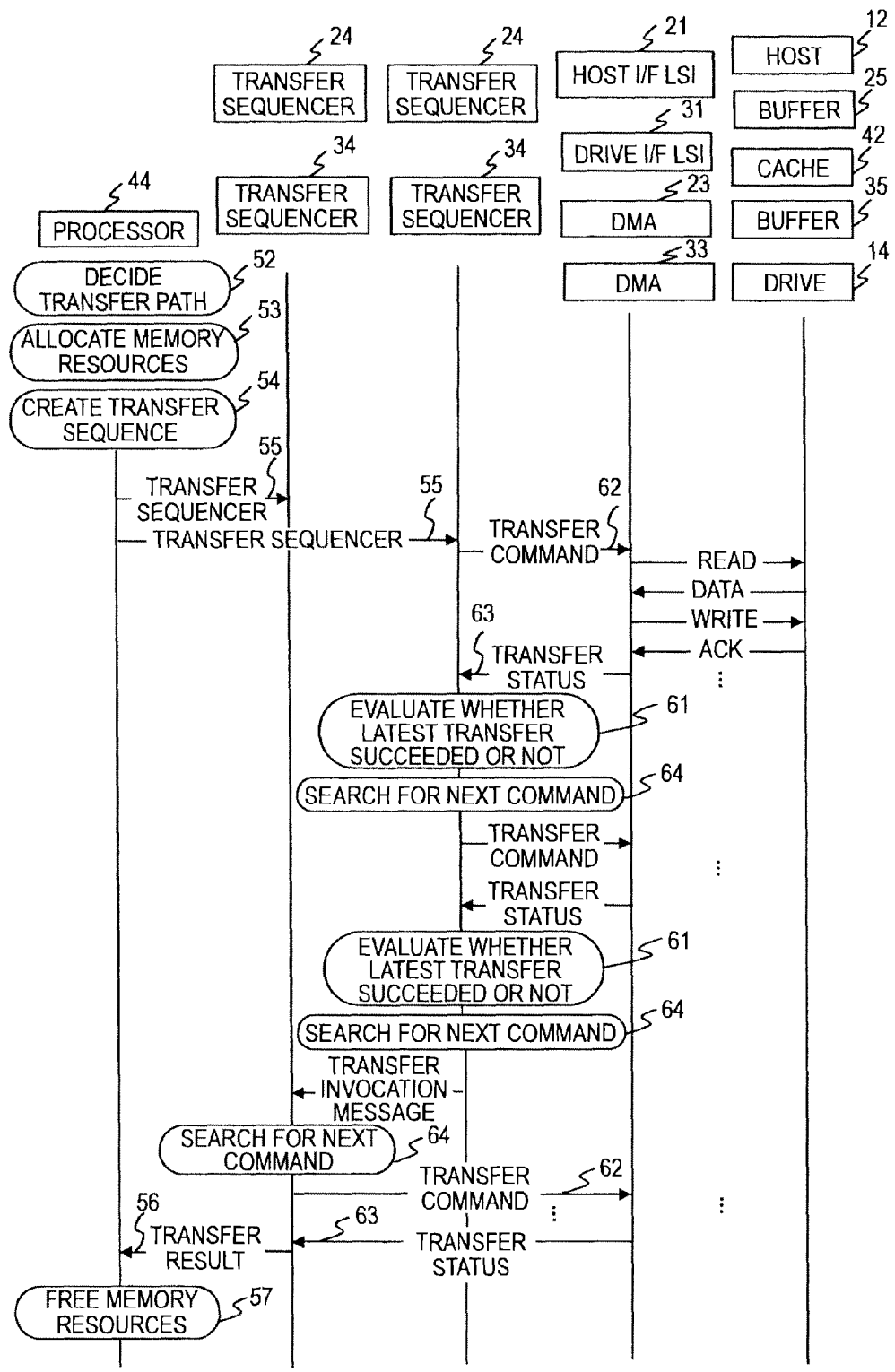

[Fig. 4]
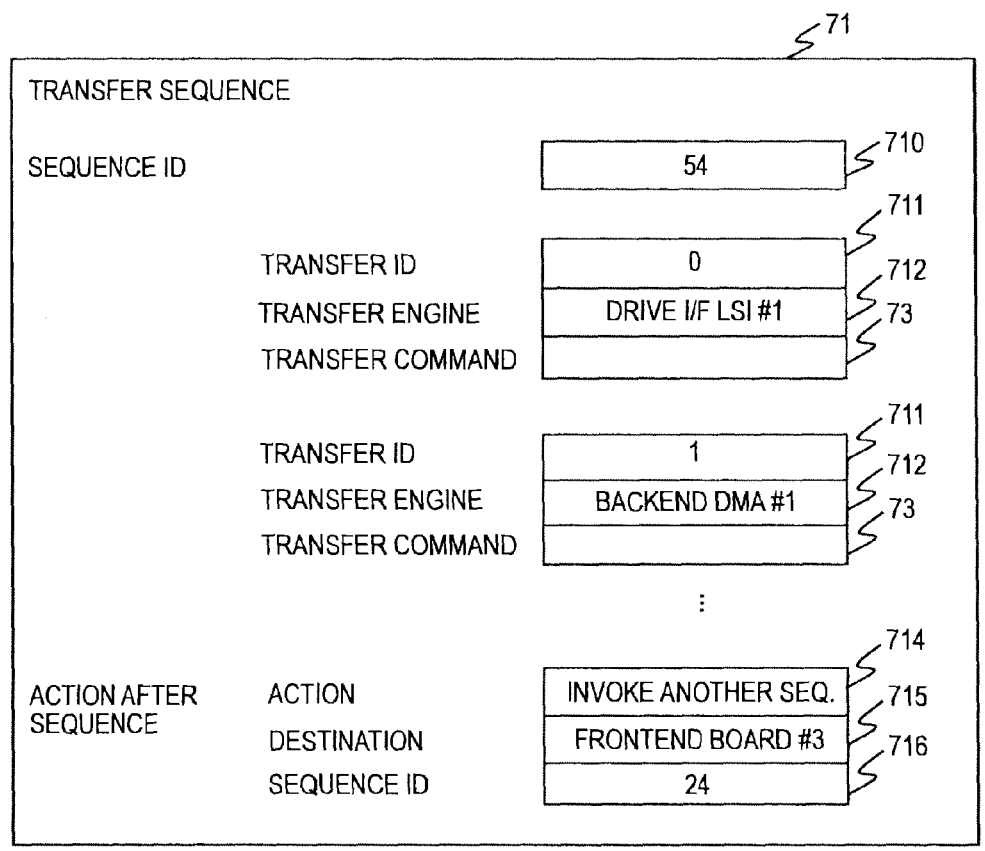

[Fig. 5]
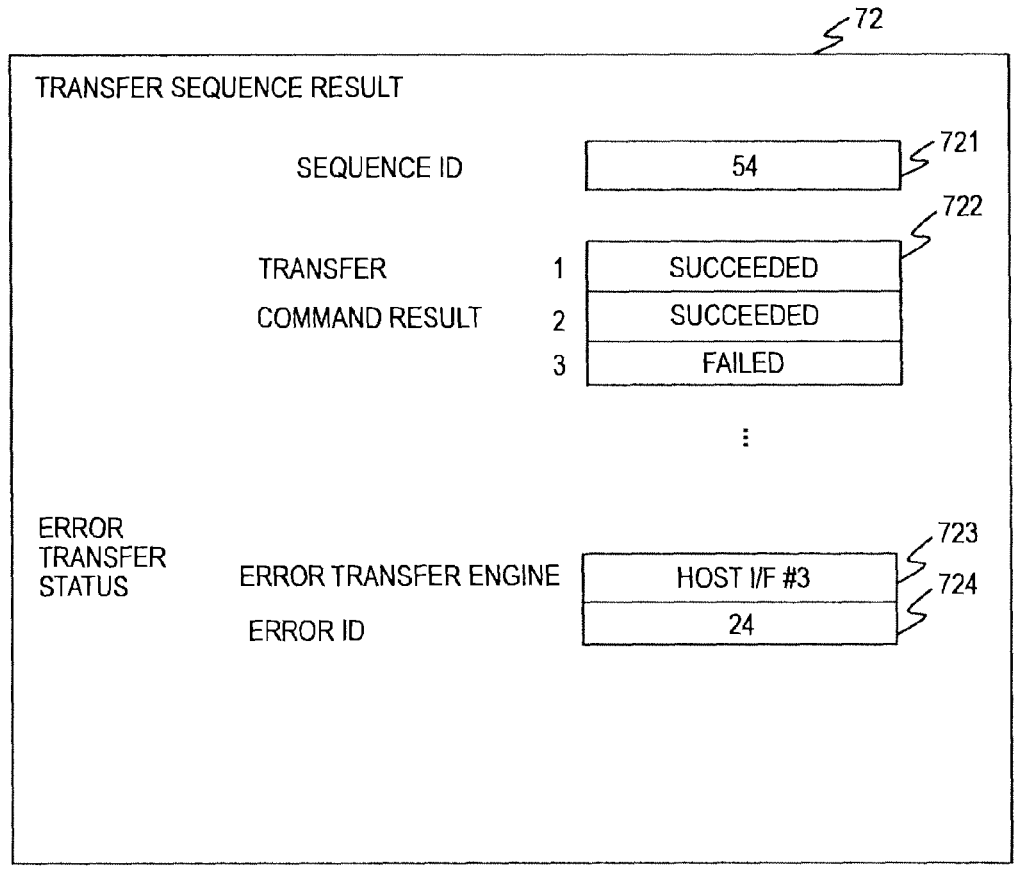
[Fig. 6]
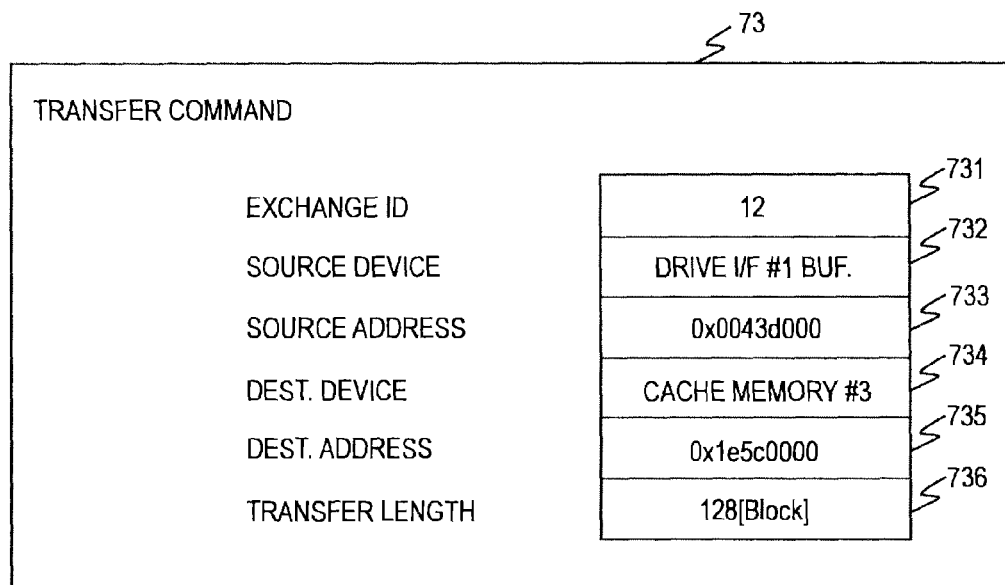

[Fig. 7]
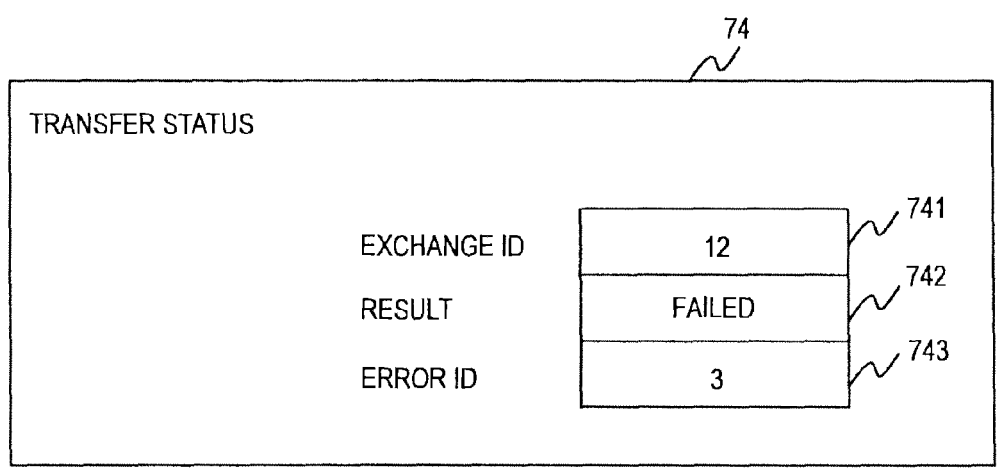

[Fig. 8]
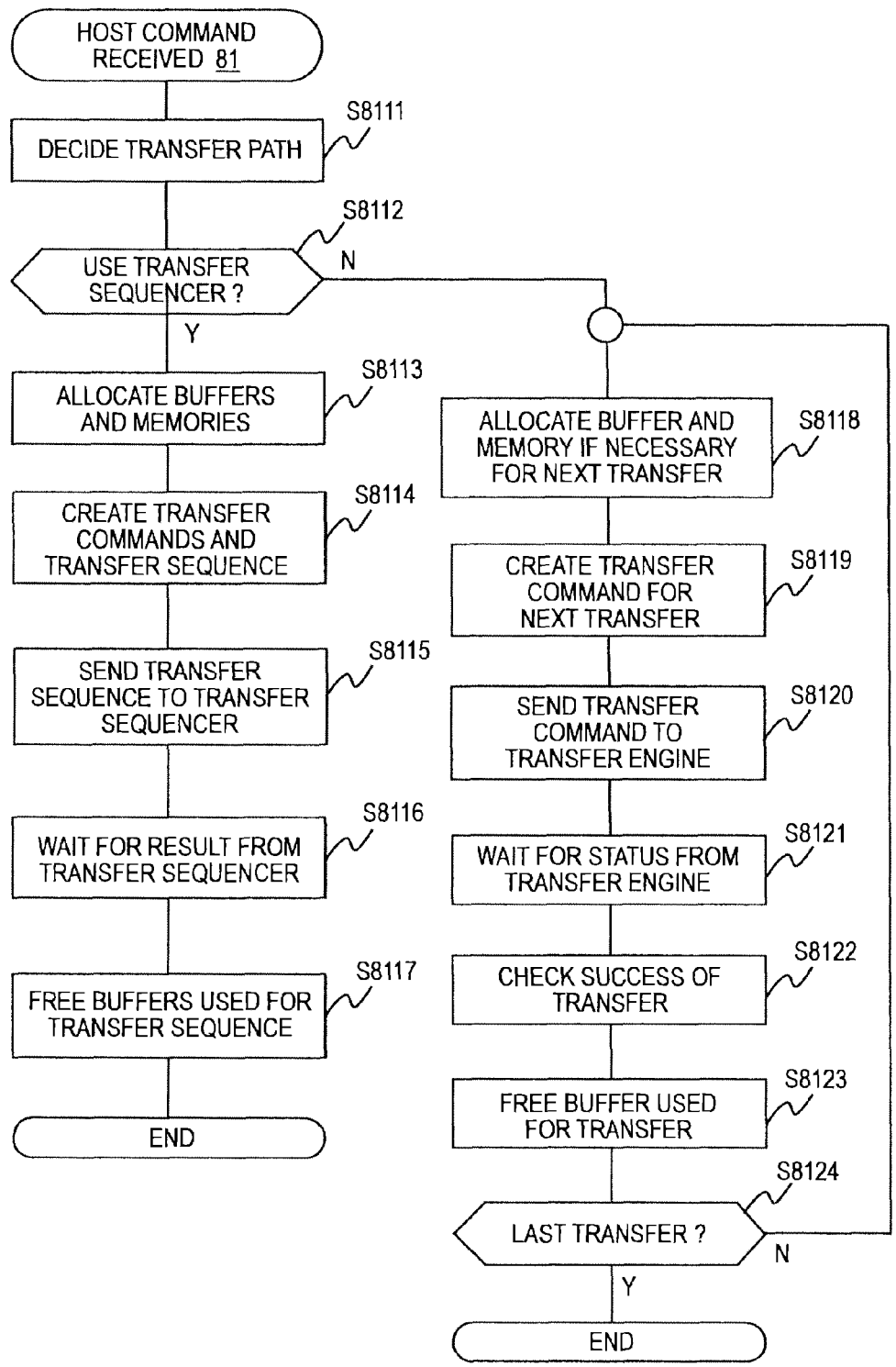

[Fig. 9]
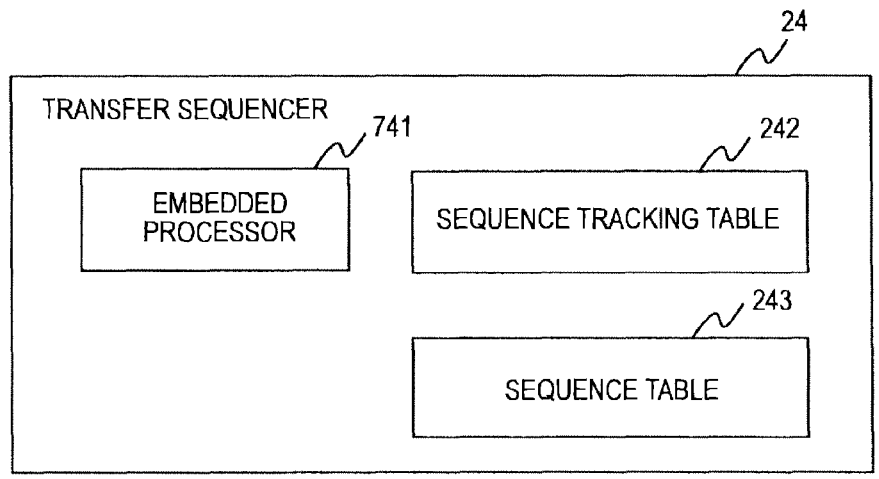
[Fig. 10]
| SEQUENCE TRACKING TABLE | | 242 |
|---|---|---|
| 2421 | 2422 | |
| SEQUENCE ID | PHASE | |
| 0 | TRANSFER 3 | |
| 1 | TRANSFER 1 | |
| 2 | TRANSFER 4 | |

[Fig. 11]
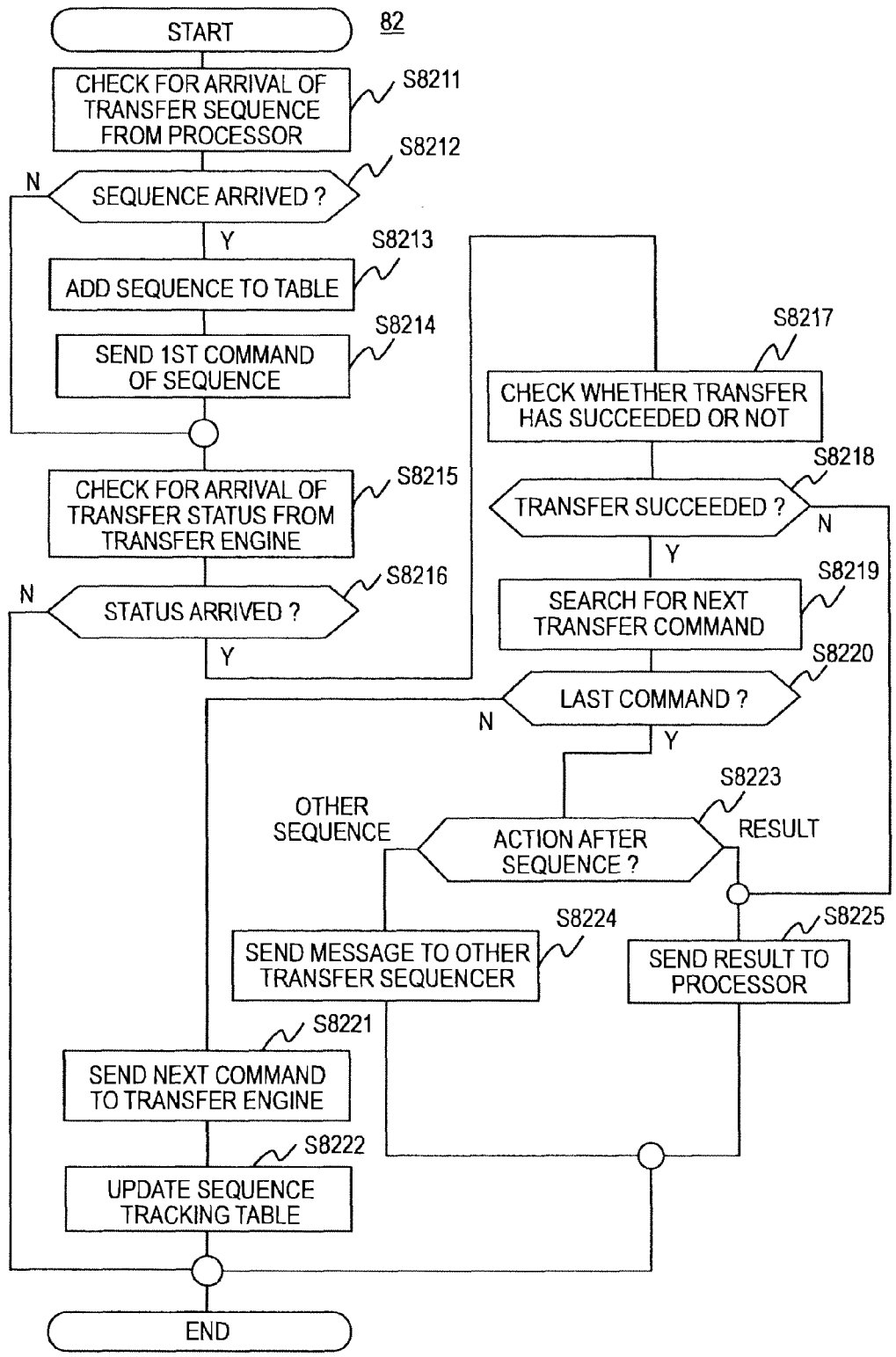

[Fig. 12]
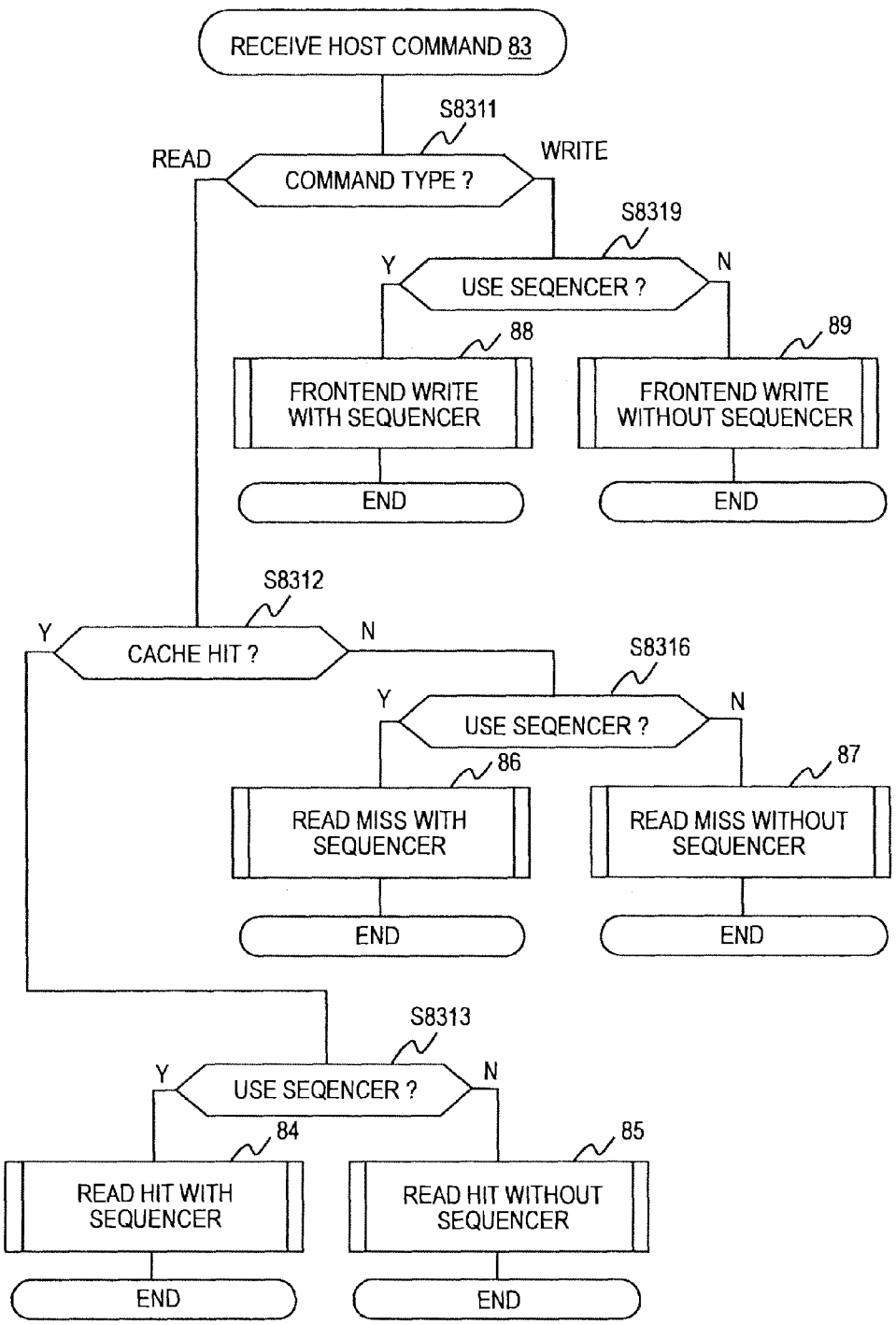

[Fig. 13]
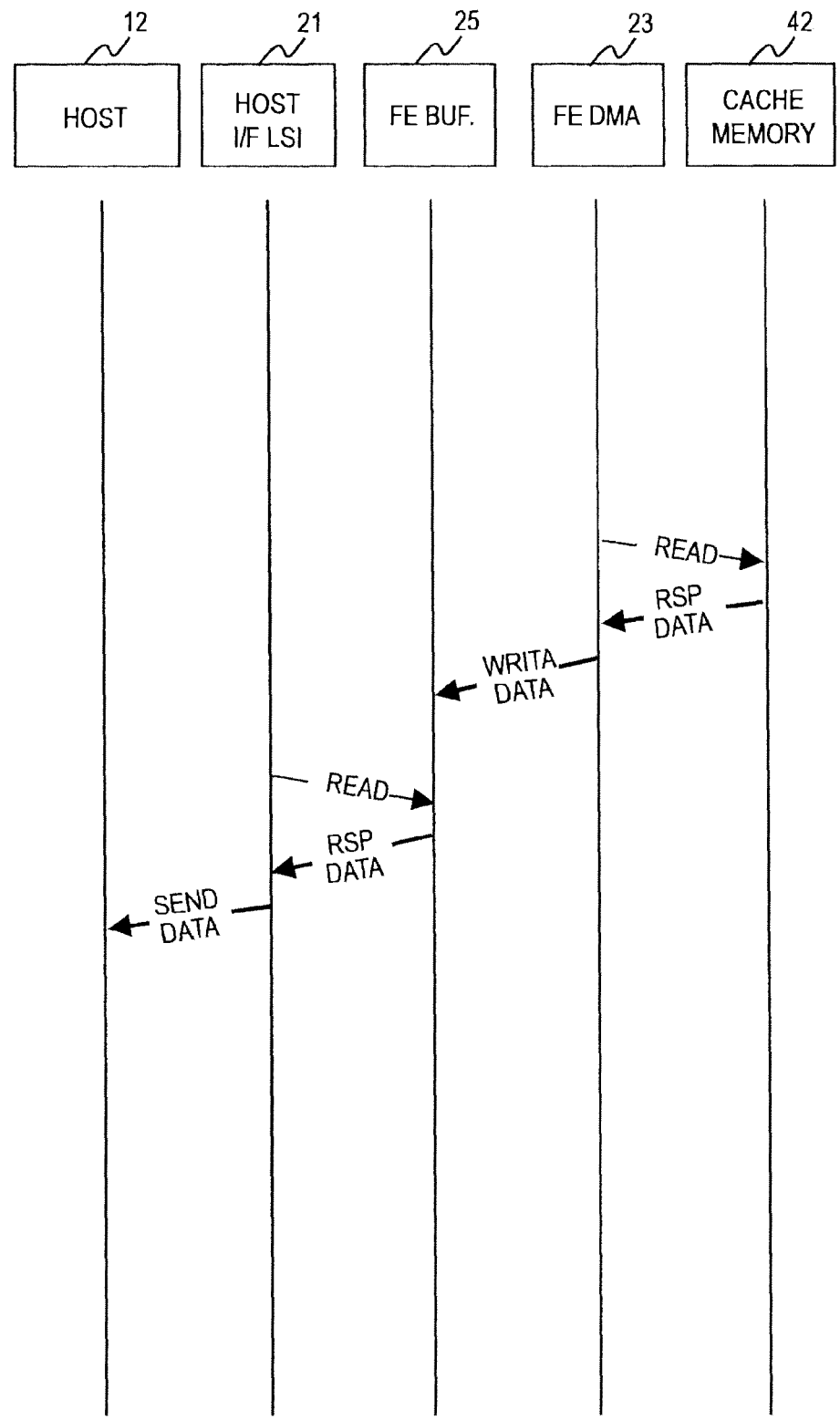

[Fig. 14]
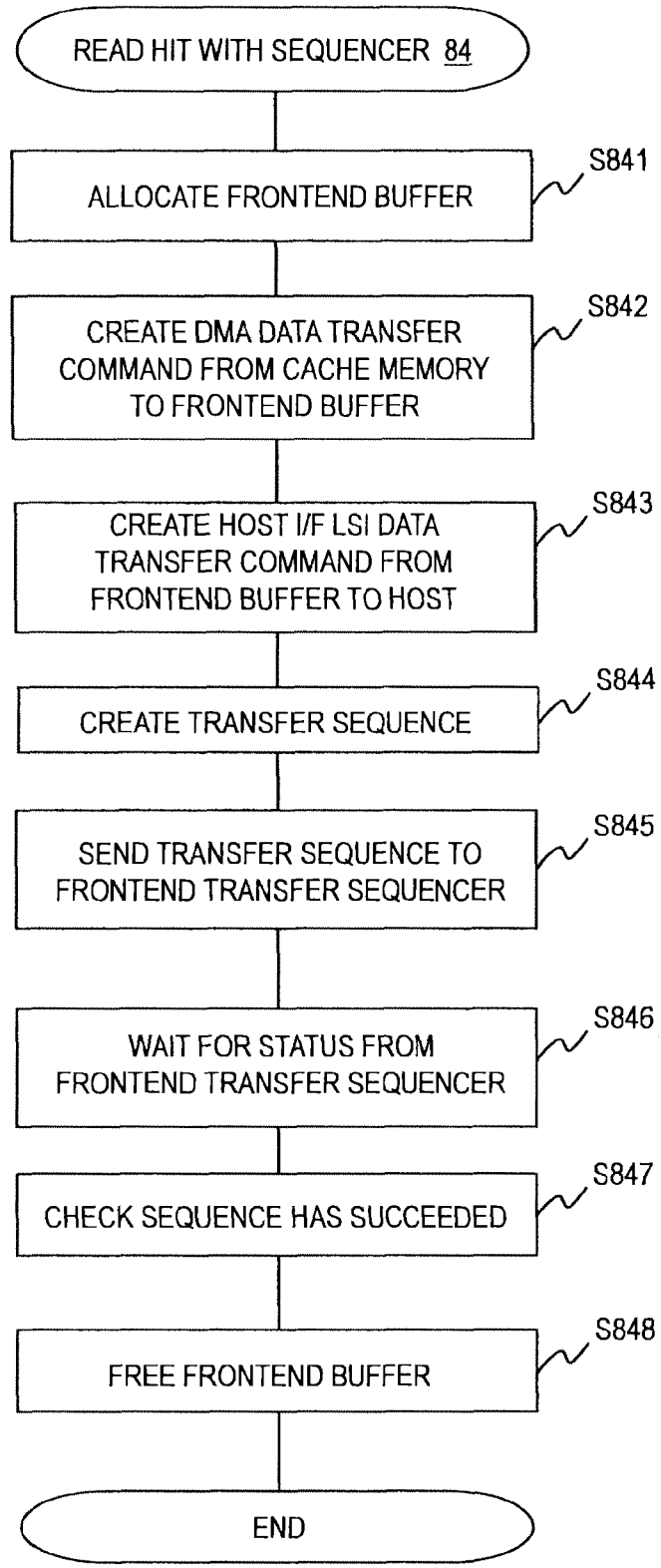

[Fig. 15]
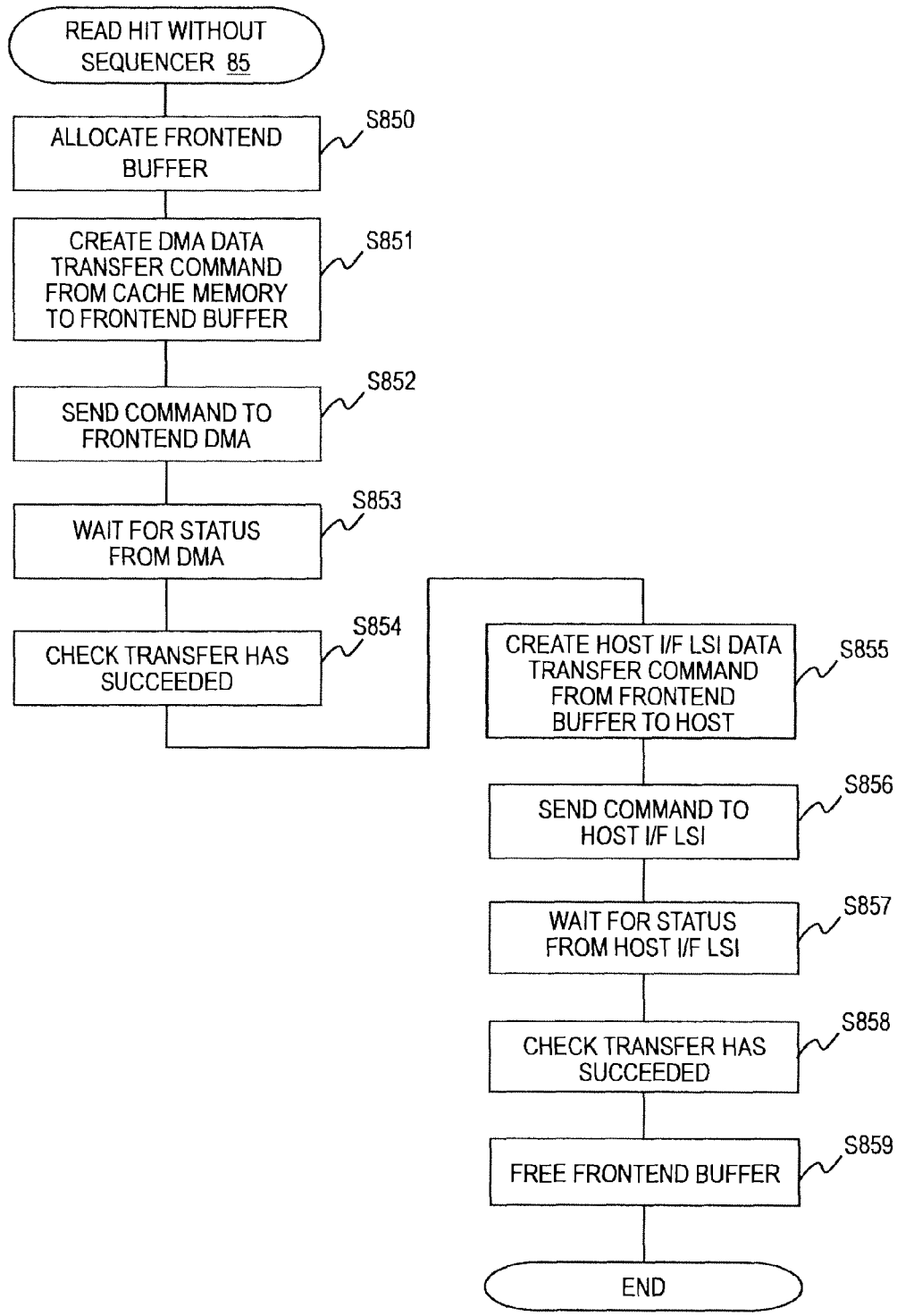

[Fig. 16]
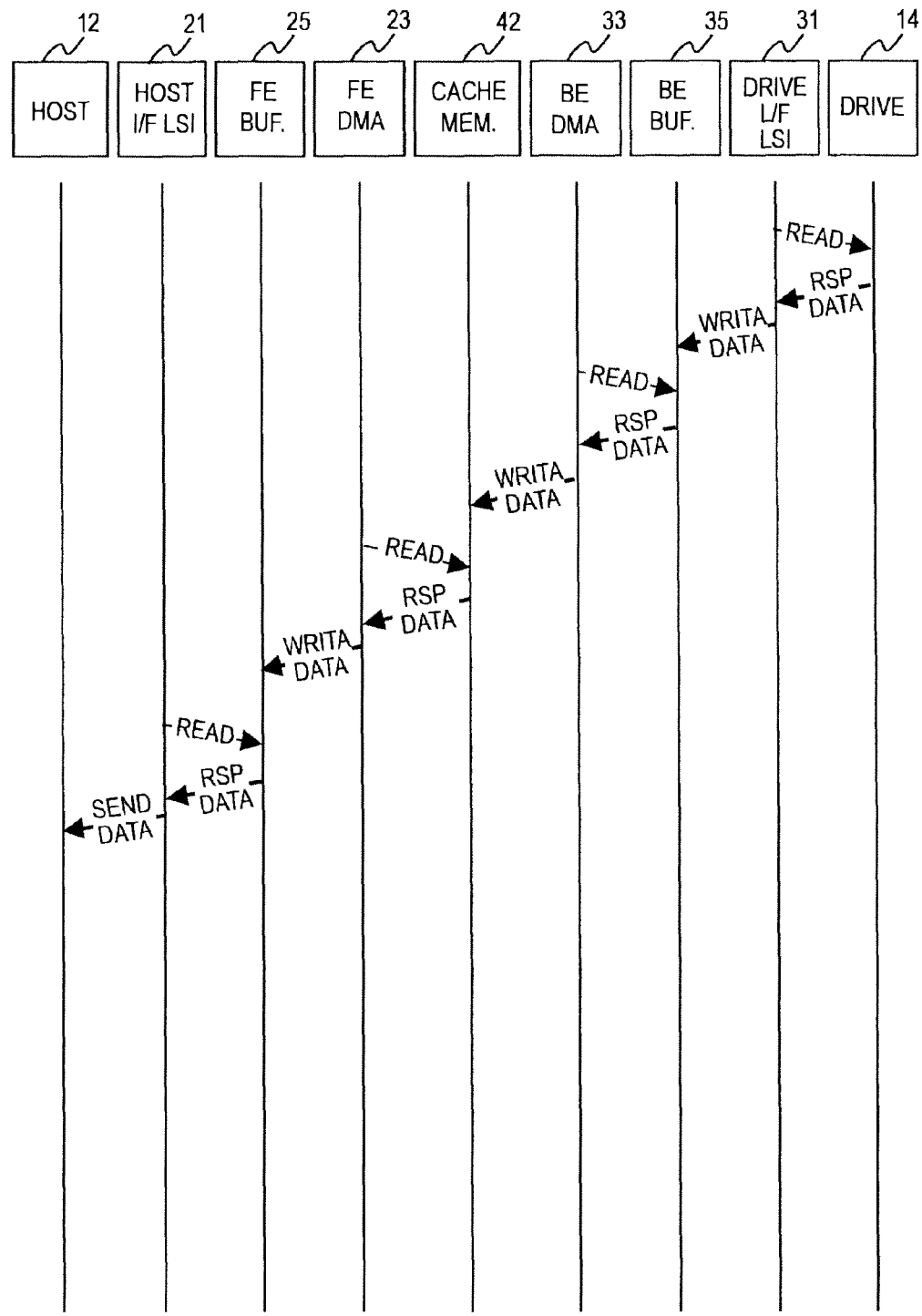

[Fig. 17]
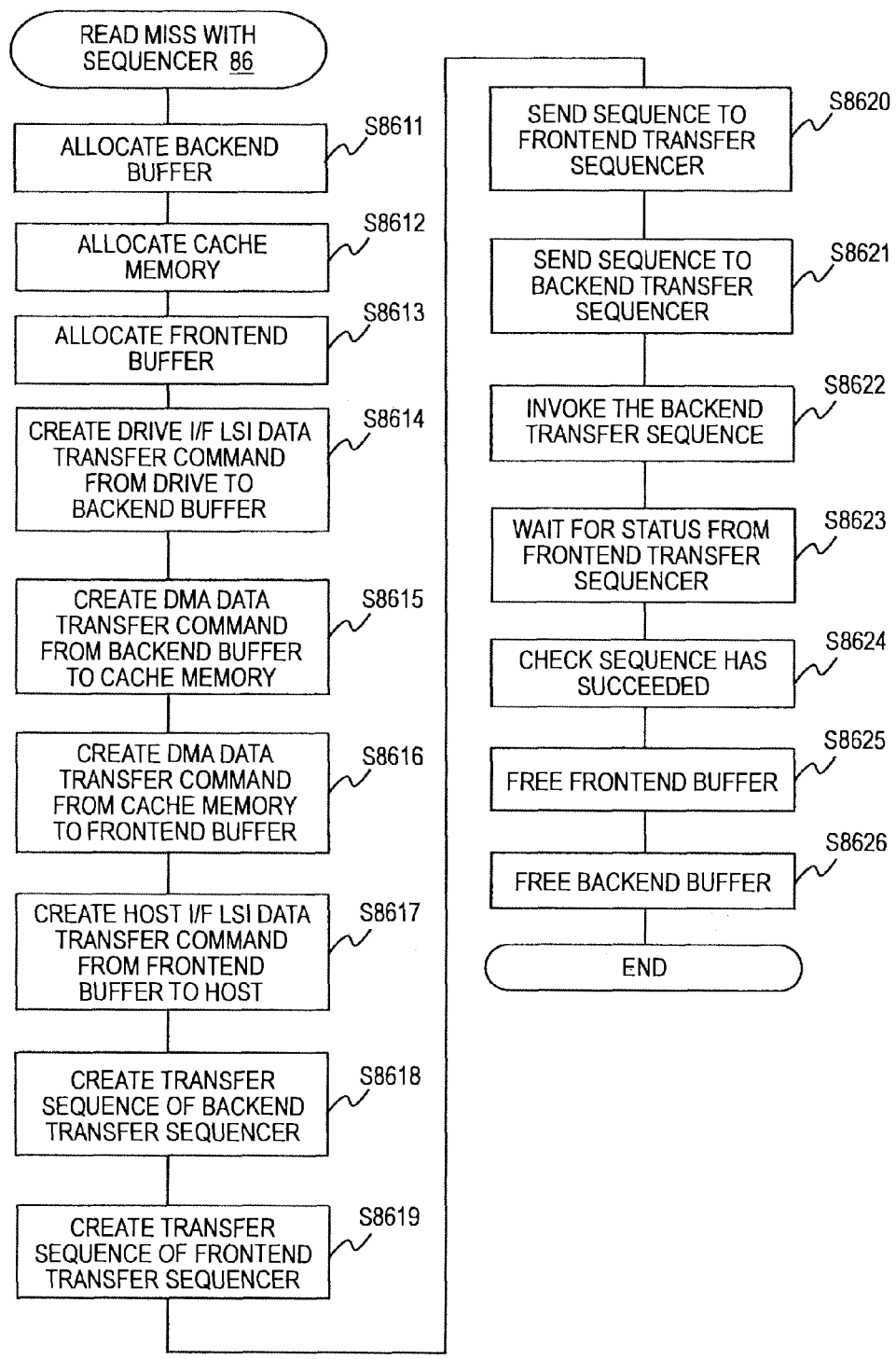

[Fig. 18]
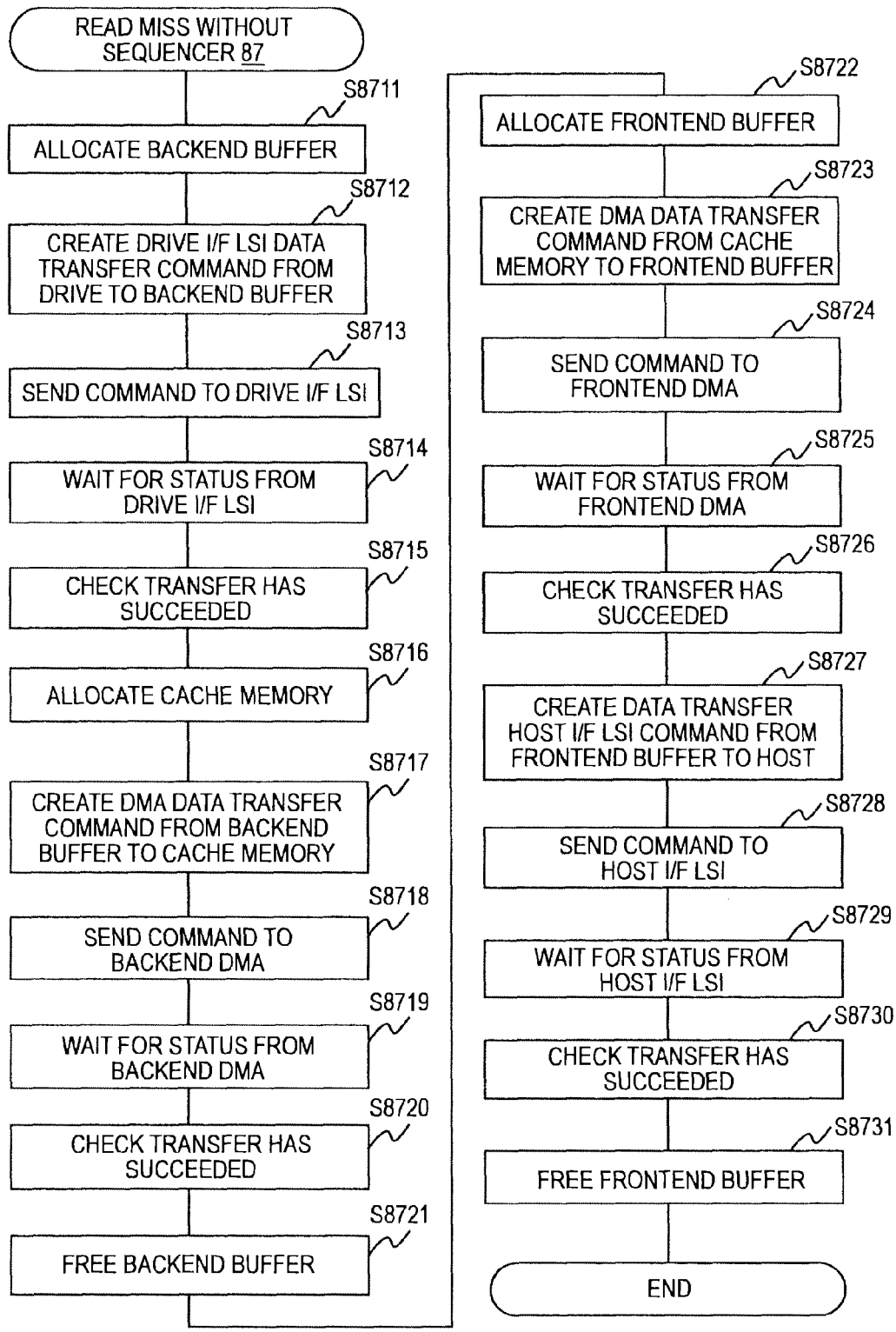

[Fig. 19]
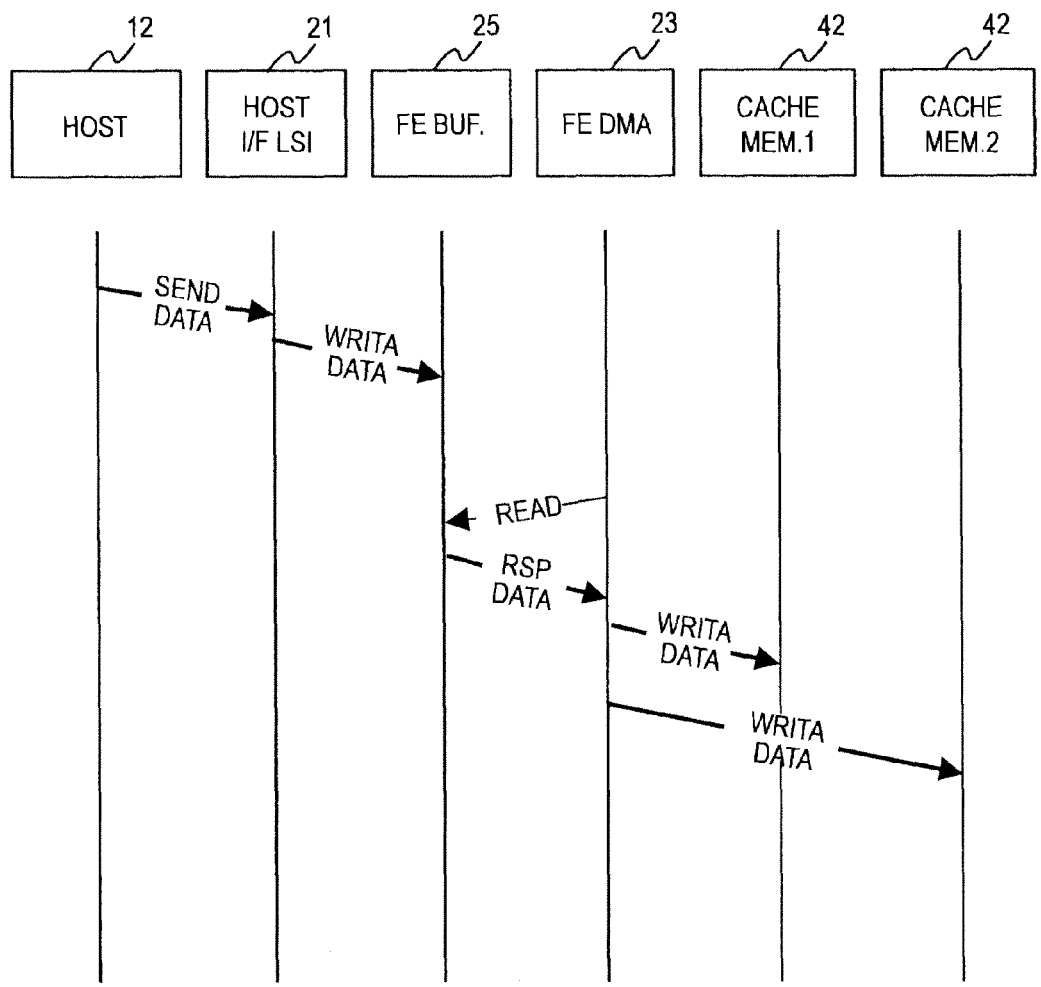

[Fig. 20]
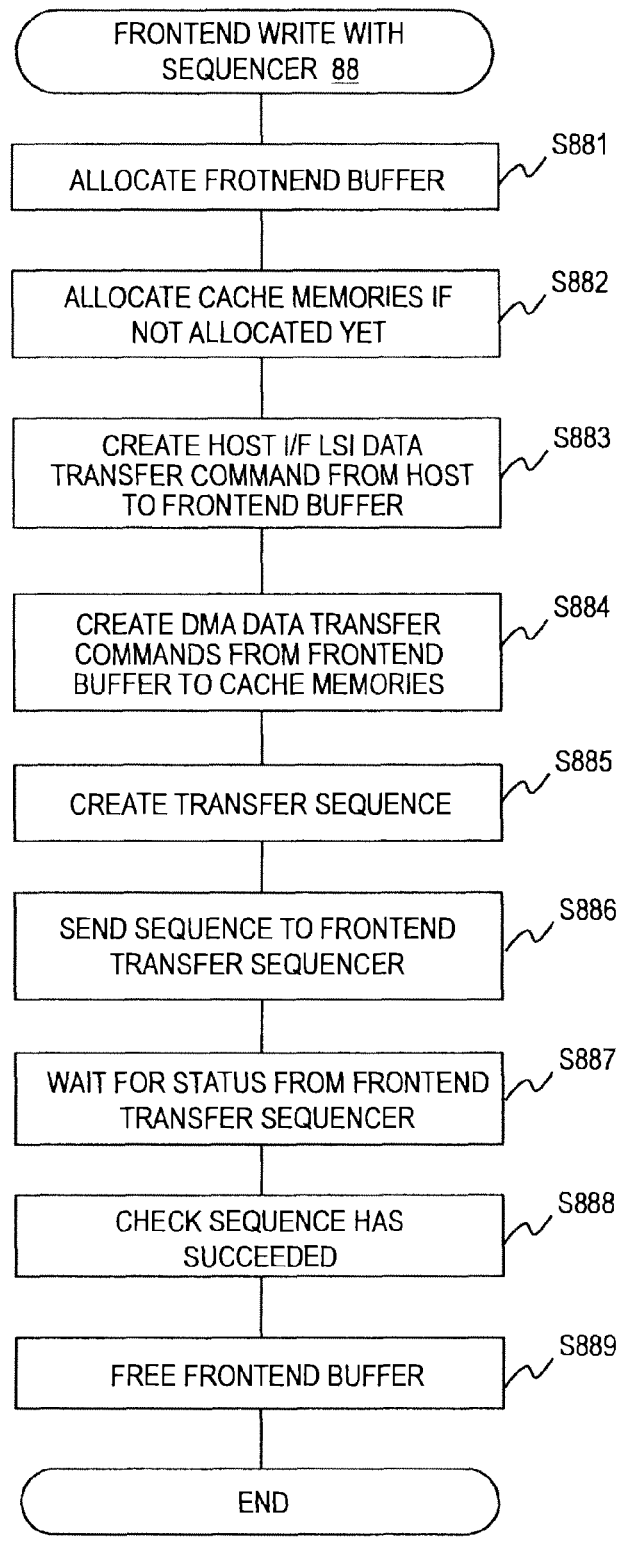

[Fig. 21]
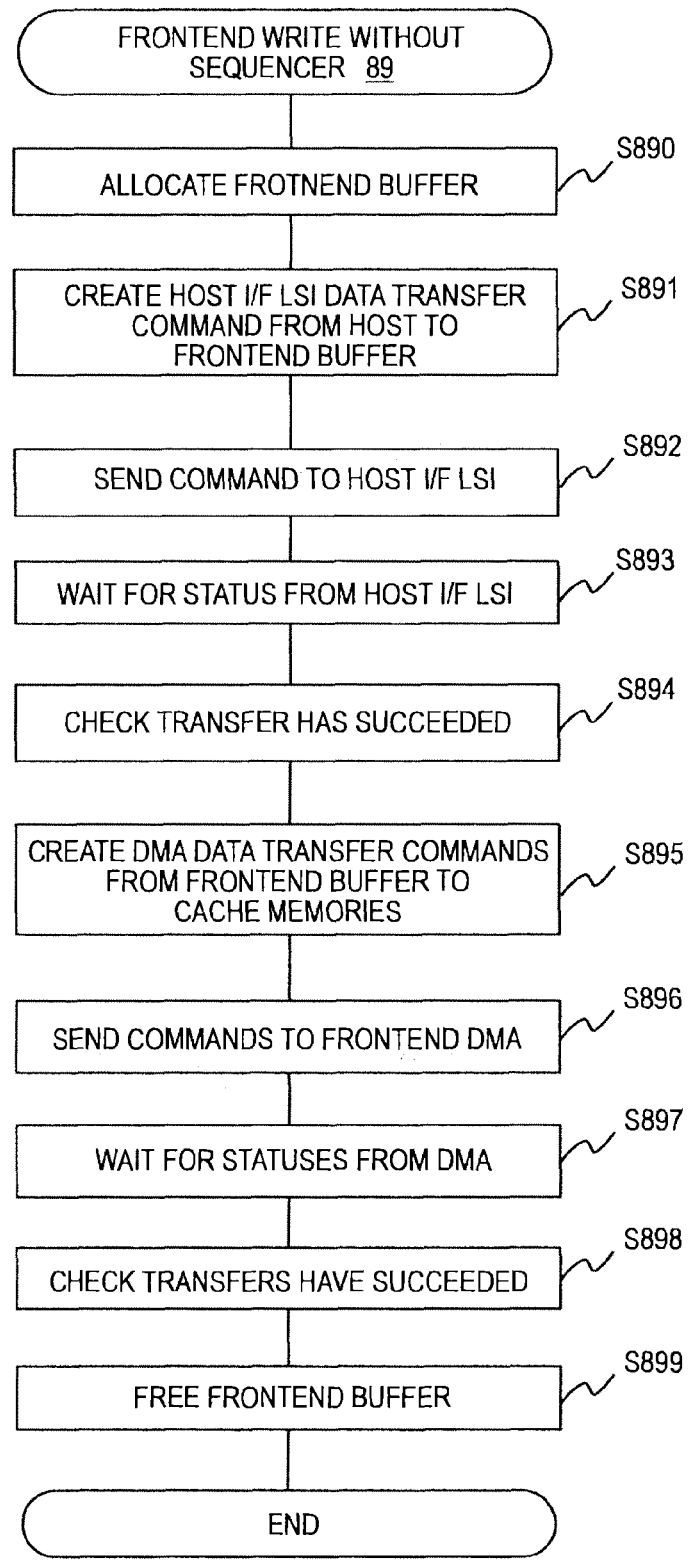

[Fig. 22]
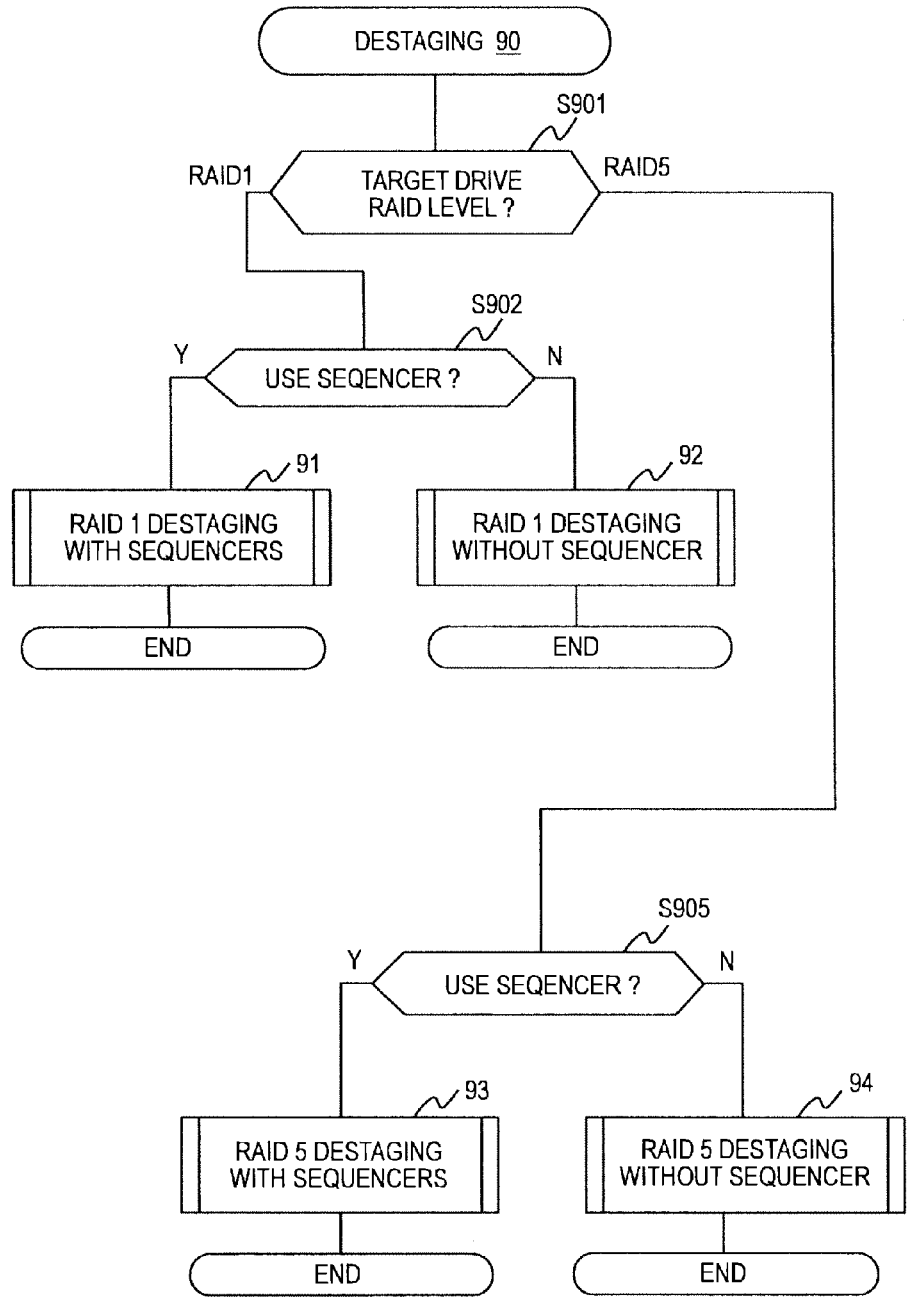

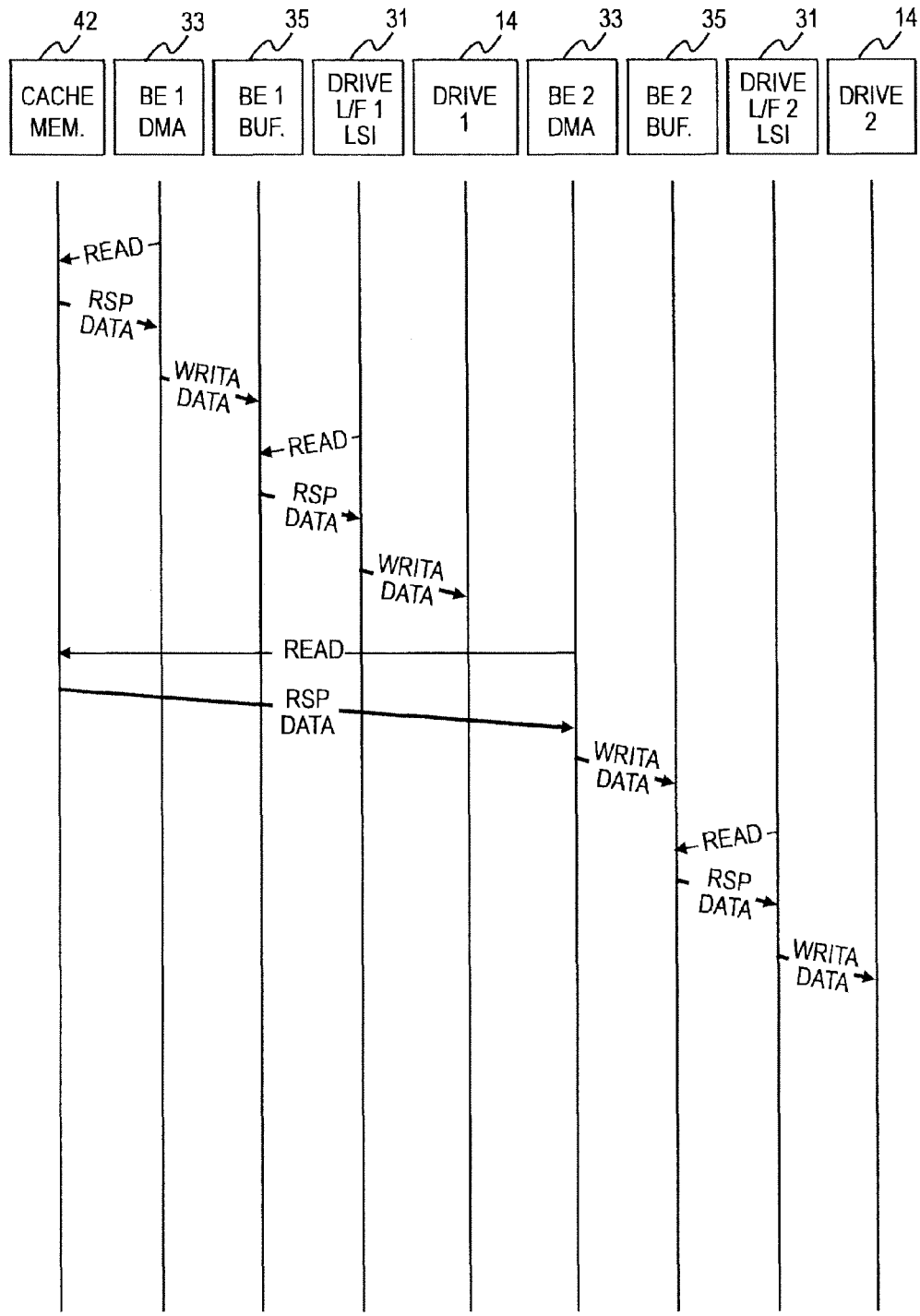
[Fig. 23]

[Fig. 24]
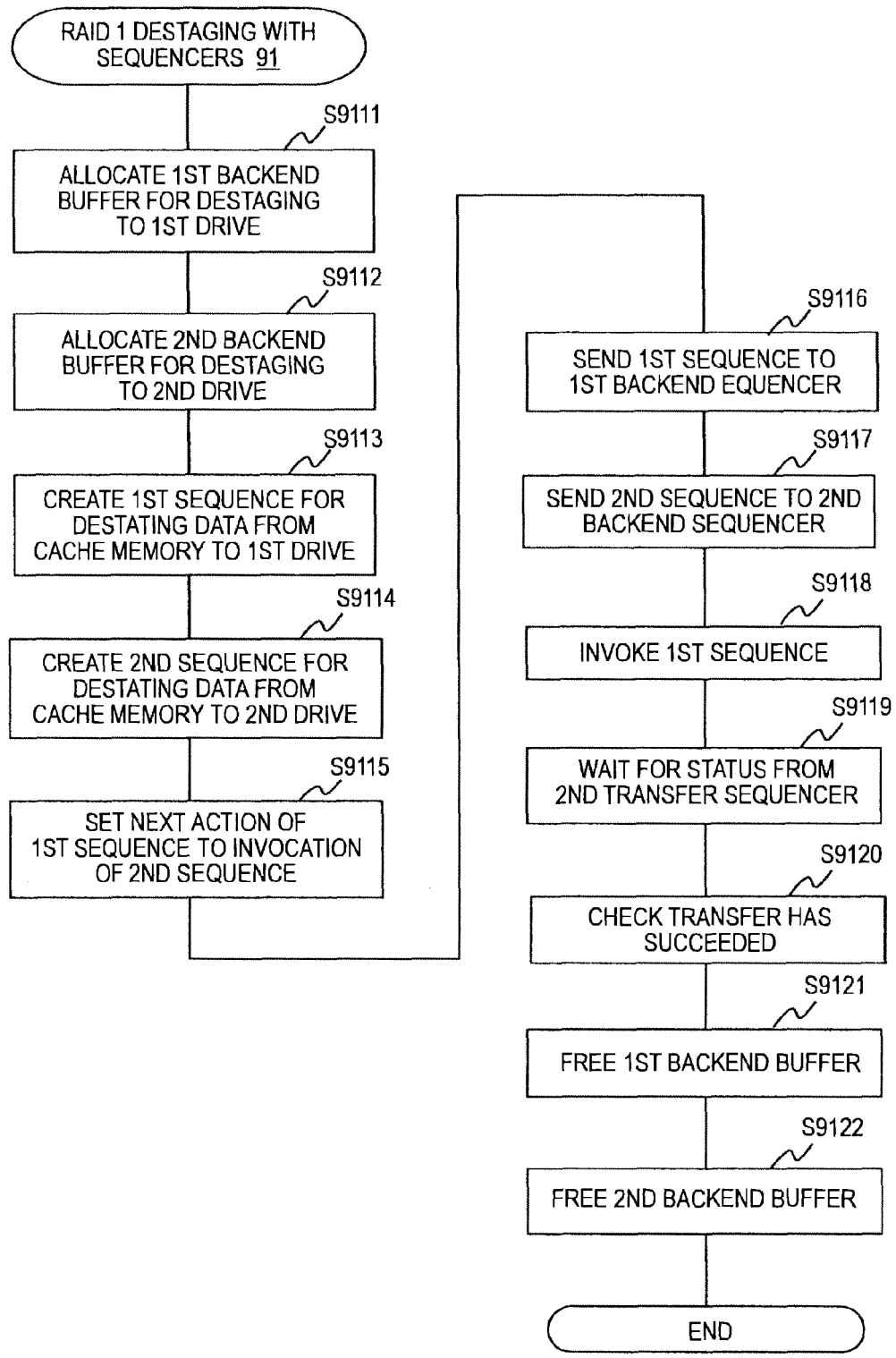

[Fig. 25]
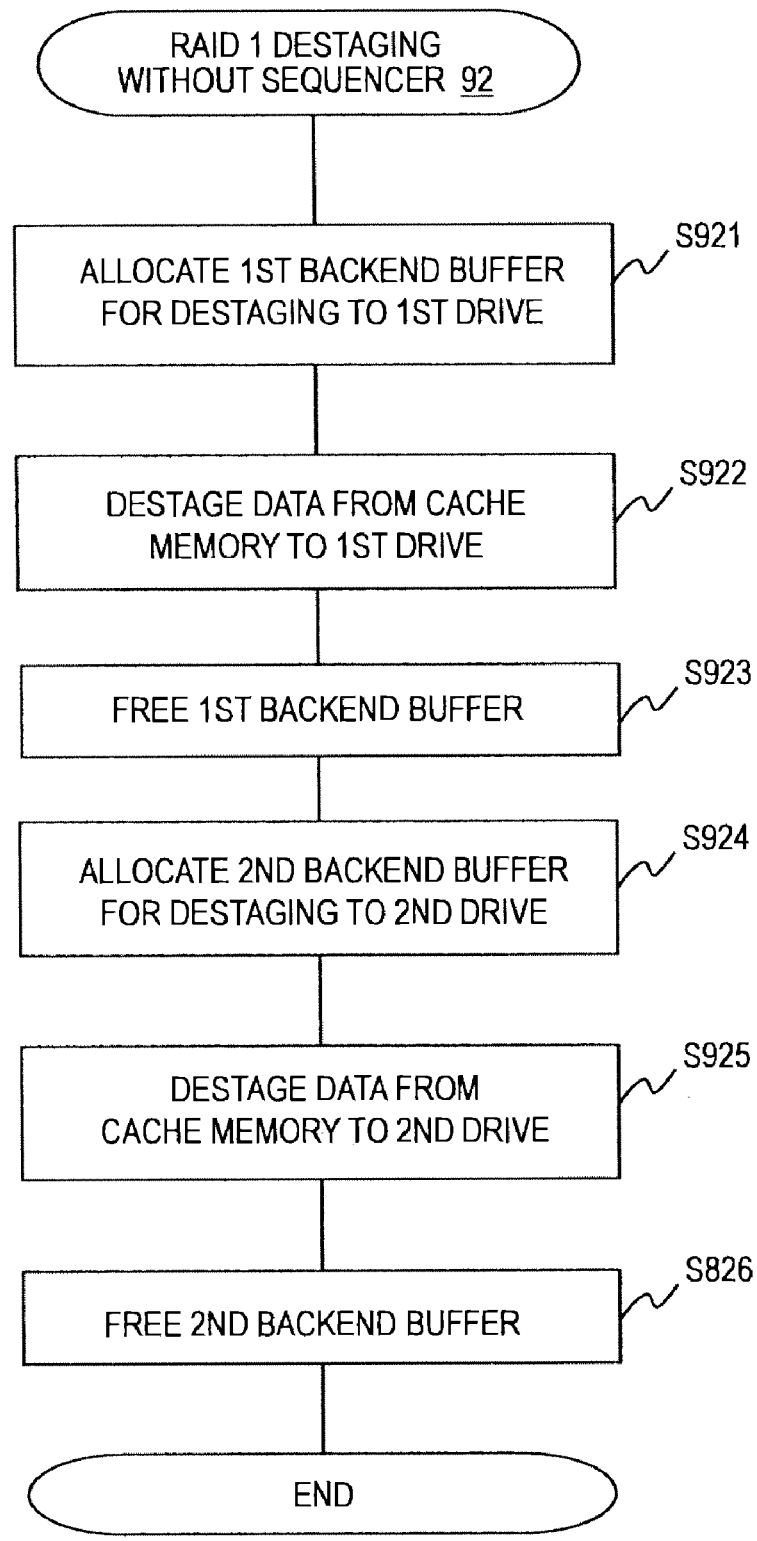

[Fig. 26]
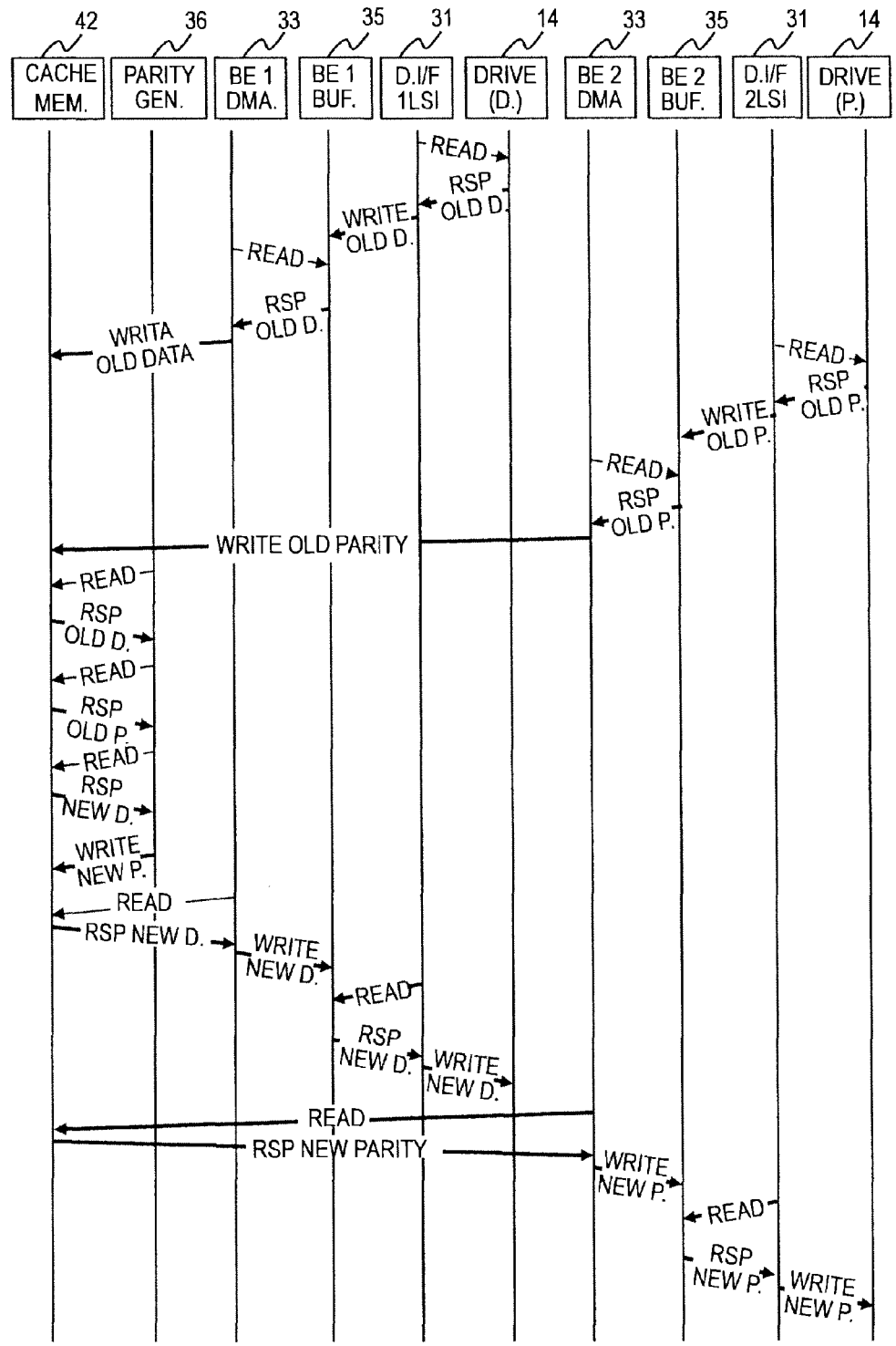

[Fig. 27]
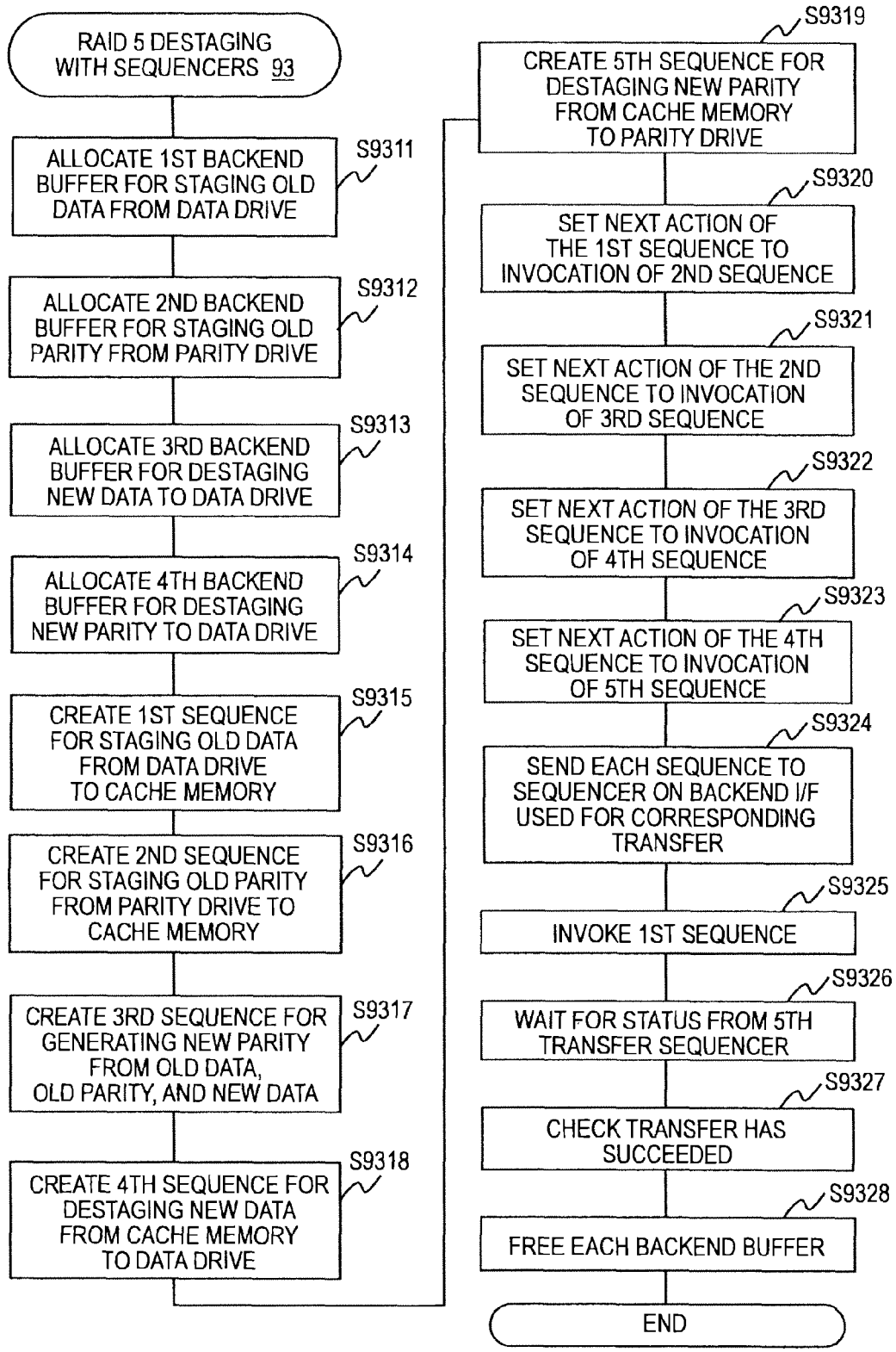

[Fig. 28]
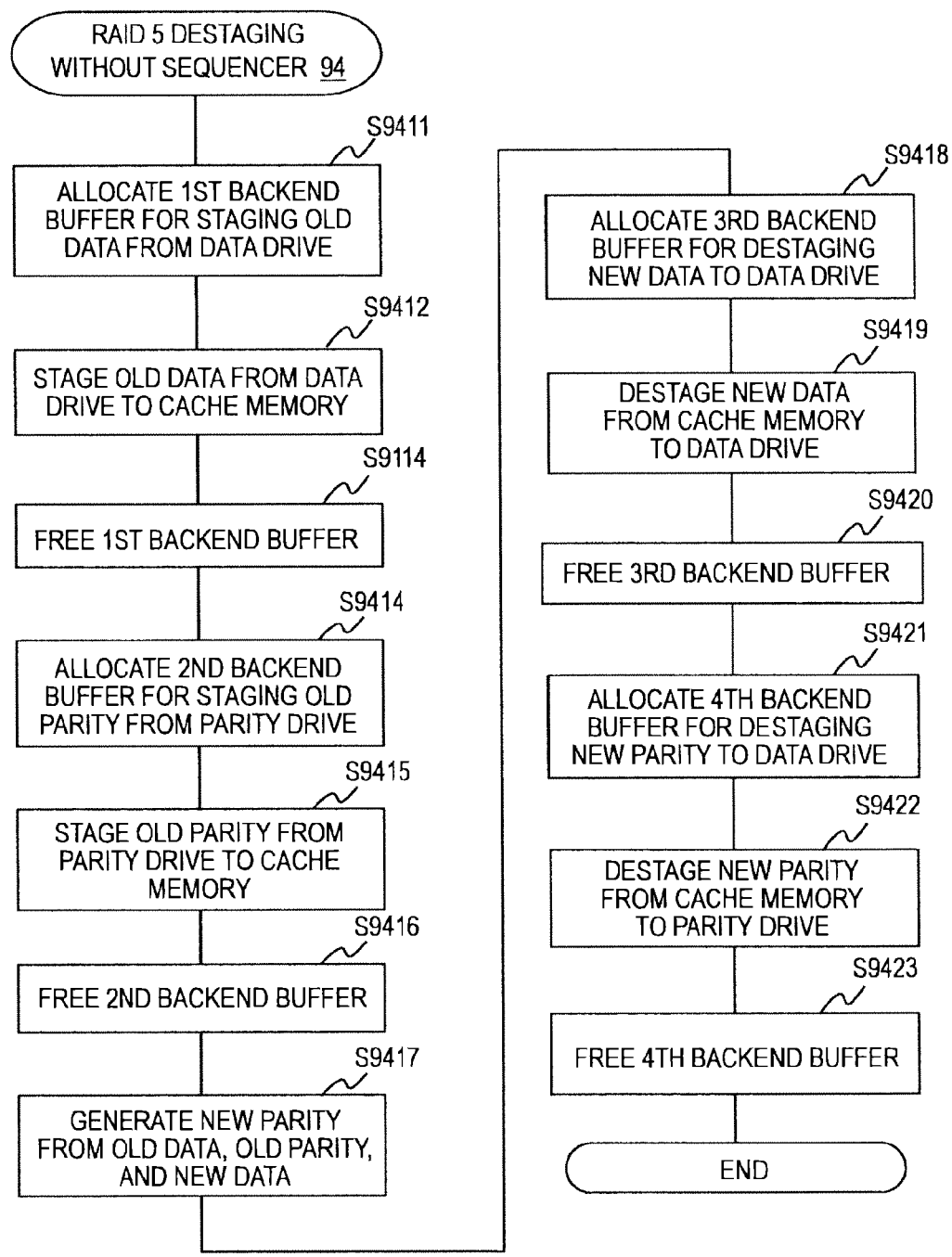

[Fig. 29]
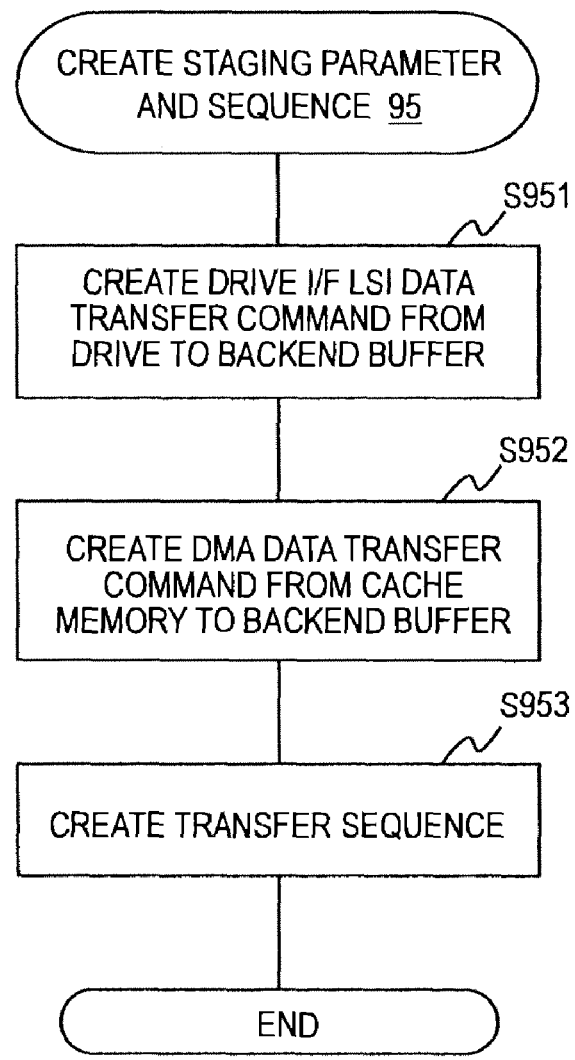

[Fig. 30]
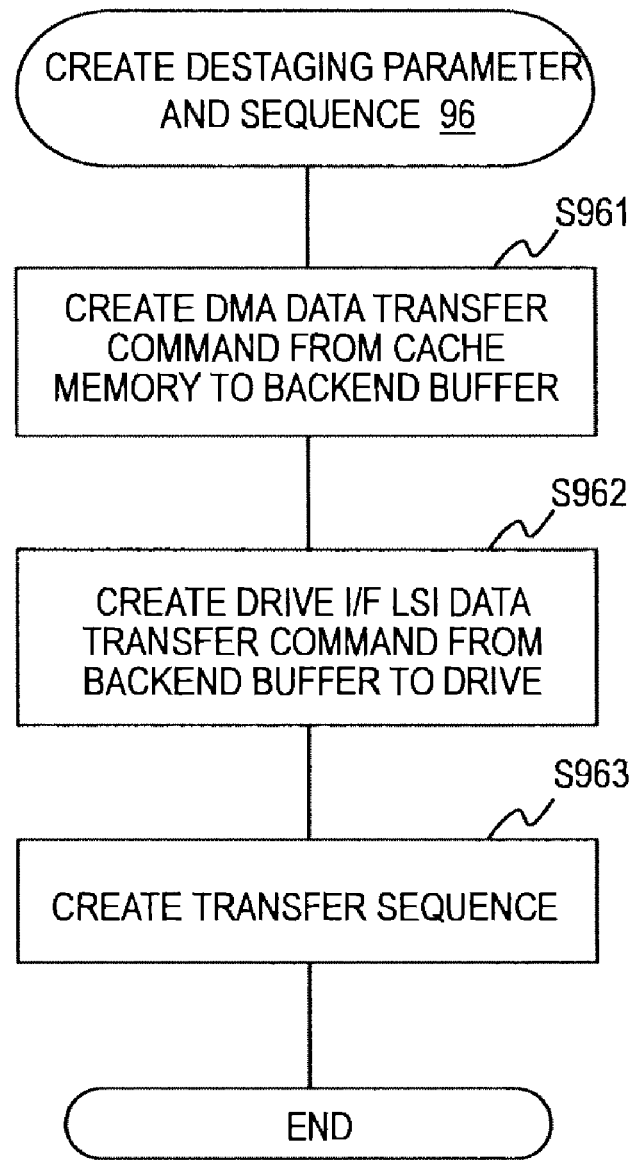

[Fig. 31]
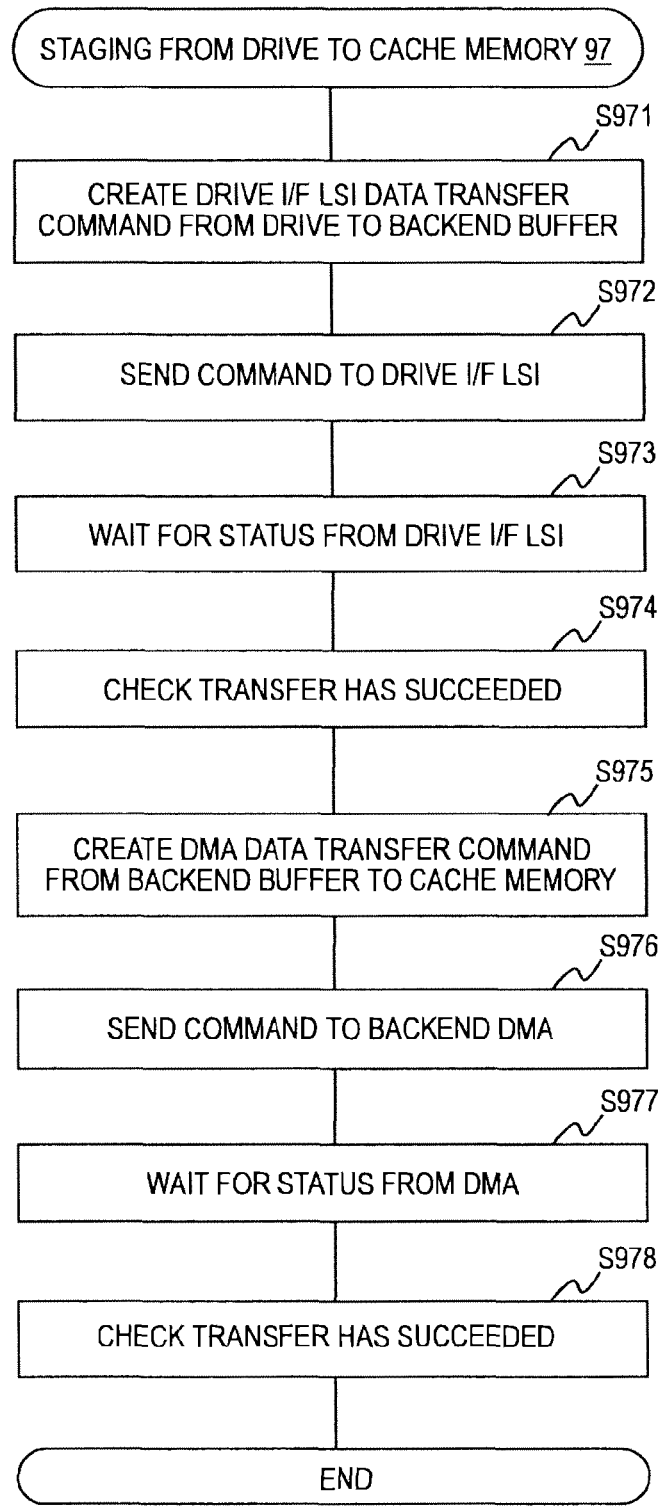

[Fig. 32]
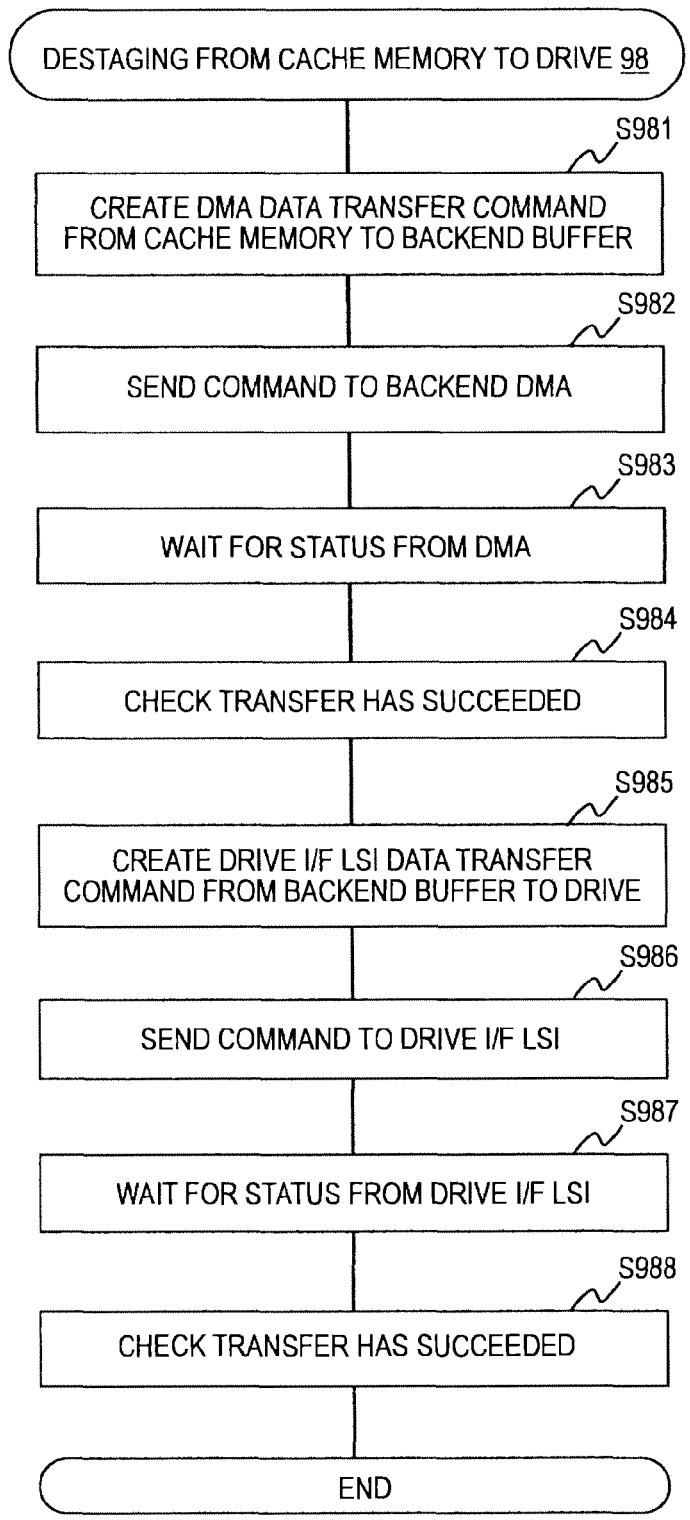

STORAGE SYSTEM

TECHNICAL FIELD

This invention relates to a storage system and, in particular, relates to data transfer control in a storage system.

BACKGROUND ART

So-called storage systems have been known that include subsystems configured with disk arrays composed of a plurality of magnetic disk drives or flash memory drives and store data in the disk arrays.

As disclosed in United States Patent Application Publication No. 2007/0201434 A1 (PTL 1), for example, a storage system is configured to include host interfaces for connecting to host computers, hard disk drives (HDDs) or solid state drives (SSDs), disk interfaces for communicating with the drives, cache memory modules for temporarily storing data to improve the performance of the storage system, and processors that receives access requests from the host computers and controls data transfers.

A large-scale storage system includes, for example, about 2,000 of disk drives, external interface with 200 ports for host computers on aggregate, and about 1-TB cache memory capacity.

Such a large-scale storage system may use buffer memories in data transfers from disk drives to host computers, like the system disclosed in "IBM System Storage DS8700 Architecture and Implementation, IBM Corporation, August 2010" (NPL 1).

For example, a large-scale storage system stores data in buffers of the disk interface or the host interface in addition to cache memories in the process from retrieving data from a disk drive until delivering it to a host computer. This configuration allows circuits such as the disk interface and the host interface to operate independently, so that the throughput of the overall system can be improved.

CITATION LIST

Patent Literature

PTL 1: United States Patent Application Publication No. 2007/0201434 A1

Non Patent Literature

NPL 1: IBM System Storage DS8700 Architecture and Implementation, IBM Corporation, August 2010

SUMMARY OF INVENTION

Technical Problem

Such a storage system requires multiple transfers of user data within the system to respond to a request from a host computer. A processor in the storage system controls the multiple data transfers in accordance with a command (a read command or a write command) from a host computer. For this reason, the processor must intervene for a plurality of times to transfer data within the system in response to an input/output (I/O) request (a read command or a write command) from a host computer, so that the load to the processor increases.

Solution to Problem

An aspect of the invention is a storage system transferring user data within the system, comprising a first transfer engine, a second transfer engine, a first storage device, a second storage device, a processor, and a transfer sequencer which is a device different from the processor. The processor creates transfer sequence information for indicating sequential order of transfers of user data. The transfer sequencer receives the transfer sequence information created by the processor and controls the first and the second transfer engines in accordance with the transfer sequence information. The first transfer engine transfers received user data to the first storage device in accordance with an instruction from the transfer sequencer. The first storage device stores the transferred user data. The second transfer engine transfers the user data in the first storage device to the second storage device in accordance with an instruction of the transfer sequencer. The second storage device stores the transferred user data.

Advantageous Effects of Invention

An aspect of this invention achieves reduction in the number of necessary interventions of a processor to respond to an I/O request received from a host computer. Consequently, the processing time of the processor necessary for processing the I/O can be reduced. Particularly in a large-scale storage, the efficiency in I/O processing and performance of the storage system are effectively improved. Problems, configurations, and effects of this invention other than those described above will be clarified by the description in the following preferred embodiments.

BRIEF DESCRIPTION OF DRAWINGS

FIG. 1 is a block diagram exemplifying a computer system including a storage system of the first embodiment.

FIG. 2 illustrates an example of a sequence of data transfers within a storage controller and the allotment of roles of a transfer sequencer and a processor in transferring data from a drive to a host computer when the storage controller receives a read request.

FIG. 3 is a sequence diagram illustrating an example of data transfers performed in the storage controller in the storage system of the first embodiment.

FIG. 4 exemplifies a transfer sequence which the processor sends to a transfer sequencer in the first embodiment.

FIG. 5 exemplifies a transfer sequence result which a transfer sequencer sends to the processor in the first embodiment.

FIG. 6 exemplifies a transfer command which a transfer sequencer sends to a transfer engine in the first embodiment.

FIG. 7 exemplifies a transfer status which a transfer engine outputs at the end of processing a transfer command in the first embodiment.

FIG. 8 is a flowchart illustrating an example of processing of the processor upon receipt of a command from a host computer in the first embodiment.

FIG. 9 illustrates an example of the configuration of a transfer sequencer in the first embodiment.

FIG. 10 exemplifies a sequence tracking table in the first embodiment.

FIG. 11 is a flowchart illustrating an example of processing performed by a transfer sequencer in the first embodiment.

FIG. 12 is a flowchart illustrating an example of I/O processing performed by the processor in response to an I/O request in the second embodiment.

FIG. 13 illustrates data transfers performed by transfer engines in read hit processing with a transfer sequencer or read hit processing without a transfer sequencer in the second embodiment.

FIG. 14 is a flowchart illustrating an example of the read hit processing with a transfer sequencer in the second embodiment.

FIG. 15 is a flowchart illustrating an example of the read hit processing without a transfer sequencer in the second embodiment.

FIG. 16 illustrates data transfers performed by transfer engines in read miss processing with transfer sequencers or read miss processing without a transfer sequencer in the second embodiment.

FIG. 17 is a flowchart illustrating an example of the read miss processing with transfer sequencers in the second embodiment.

FIG. 18 is a flowchart illustrating an example of the read miss processing without a transfer sequencer in the second embodiment.

FIG. 19 illustrates data transfers performed by transfer engines in frontend write processing with a transfer sequencer or frontend write processing without a transfer sequencer in the second embodiment.

FIG. 20 is a flowchart illustrating an example of the frontend write processing with a transfer sequencer in the second embodiment.

FIG. 21 is a flowchart illustrating an example of the frontend write processing without a transfer sequencer in the second embodiment.

FIG. 22 is a flowchart illustrating an example of destaging for writing data which is written to a cache memory by a host computer to a drive in the second embodiment.

FIG. 23 illustrates data transfers performed by transfer engines in RAID 1 destaging with transfer sequencers or RAID 1 destaging without a transfer sequencer in the second embodiment.

FIG. 24 is a flowchart illustrating an example of the RAID 1 destaging with transfer sequencers in the second embodiment.

FIG. 25 is a flowchart illustrating an example of the RAID 1 destaging without a transfer sequencer in the second embodiment.

FIG. 26 illustrates data transfers performed by transfer engines in RAID 5 destaging with transfer sequencers or RAID 5 destaging without a transfer sequencer in the second embodiment.

FIG. 27 is a flowchart illustrating an example of the RAID 5 destaging with transfer sequencers in the second embodiment.

FIG. 28 is a flowchart illustrating an example of the RAID 5 destaging without a transfer sequencer in the second embodiment.

FIG. 29 is a flowchart illustrating an example of making a staging sequence to make a transfer sequence for staging data in the second embodiment.

FIG. 30 is a flowchart illustrating an example of making a destaging sequence to make a transfer sequence for destaging data in the second embodiment.

FIG. 31 is a flowchart illustrating an example of staging data to the cache memory used in the destaging without a transfer sequencer in the second embodiment.

FIG. 32 is a flowchart illustrating an example of destaging data to a drive used in the destaging without a transfer sequencer in the second embodiment.

DESCRIPTION OF EMBODIMENTS

This invention relates to a technique to improve performance in a storage system. Hereinafter, preferred embodiments of this invention will be described with reference to the accompanying drawings. It should be noted that the embodiments are merely examples to embody the invention but not to limit the technical scope of the invention. Throughout the drawings, common components are denoted by the same reference signs.

First Embodiment

This embodiment is an example of a method that automates checking the starts/ends of internal data transfers, which is performed by a processor in a traditional storage system, to improve performance. Hereinafter, details of this embodiment will be described with reference to the accompanying drawings.

FIG. 1 exemplifies a computer system including a storage system 1 of this embodiment and a host computer 12 that processes and computes data. The storage system 1 includes a storage controller 11 and an enclosure 13 that houses drives 14 for storing data. The computer system may include a plurality of host computers 12. The storage system 1 may include a plurality of drive enclosures 13.

The drive enclosure 13 houses a plurality of drives 14. Typically, the drives 14 are hard disk drives (HDDs) having non-volatile magnetic disks or solid state drives (SSDs) with non-volatile semiconductor memories (such as flash memories) mounted. The drives 14 store data (user data) sent by the host computers 12. The plurality of drives 14 achieve redundancy of data by RAID computing to prevent data loss when a failure occurs to some drive 14.

The storage controller 11 includes a frontend board 2 for connecting to a host computer 12, a backend board 3 for connecting to a drive enclosure 13 (drives 14), a cache memory board 41 for mounting a cache memory 42, a processor board 43 for mounting a processor 44 that performs internal processing, and an internal network 46 for connecting these components. As shown in FIG. 1, the storage controller 11 typically includes a plurality of frontend boards 2 and a plurality of backend boards 3.

Each frontend board 2 includes a host interface LSI 21 for connecting to a host computer 12, a data transfer LSI 22 for transferring data in the storage controller 11, and a frontend buffer 25 for relaying data transferred inside the storage controller 11 to/from the host computer 12 (for storing user data temporarily).

The data transfer LSI 22 includes a frontend DMA controller (called DMA hereinbelow) 23 for transferring data between the frontend buffer 25 and the cache memory 42 and a transfer sequencer 24 for sequence control of data transfers. The host interface LSI 21 has a function that converts a protocol used in communication between the host computer 12 and the storage controller 11, such as fibre channel (FC), fibre channel over Ethernet (FCoE), or iSCSI, into a protocol used in the storage controller 11, such as PCI-Express.

Each backend board 3 includes a drive interface LSI 31 for connecting to the drive enclosure 13, a data transfer LSI 32 for transferring data in the storage controller 11, and a backend buffer 35 for relaying data transferred inside the storage controller to/from the drive enclosure 13 (for storing user data temporarily).

The data transfer LSI 32 includes a backend DMA 33 for transferring data between the backend buffer 35 and the cache memory 42, a transfer sequencer 34 for controlling the sequence of data transfers, and a parity generator 36 for performing parity calculation to achieve data redundancy in a RAID 5, a RAID 6 array, and the like.

The drive interface LSI 31 has a function that converts a protocol used in communication between the drives 14 and the storage controller 11, such as fibre channel (FC) or serial attached SCSI (SAS), into a protocol used in the storage controller 11, such as PCI-Express.

The cache memory board 41 has a cache memory 42 for temporarily storing user data to be read or written by a host computer 12. The processor board 43 has a processor 44 for controlling the storage controller 11 and a memory 45 for storing data and programs to be handled by the processor 44. The data and programs to be handled by the processor 44 are loaded from a non-volatile memory (not shown) in the storage controller 11 or the drives 14.

In the following description, the host interface LSI 21, the frontend DMA 23, the backend DMA 33, and the drive interface LSI 31 for transferring data are generally called data transfer engines. The frontend buffer 25, the backend buffer 35 and the cache memory 42 are generally called data transfer relay memories or relay memories. The cache memory 42 and buffers 25 and 35 are typically RAMs of semiconductor memories, which are volatile memory devices in which stored data are lost when no power is supplied.

The relay memories temporarily store user data in transferring user data between a final data storage area in the storage system (in this example, a storage area in a drive 14) and a host computer 12. The data transfer engines transfer data between relay memories, between a relay memory and (a storage area in) a host computer 12, or between a relay memory and a drive 14.

Although not shown in FIG. 1, the storage controller 11 may include an external interface board for connecting to another storage system. The external interface board includes, for example, an external interface LSI, a buffer, and a data transfer LSI. The storage controller 11 sends a command or user data to or receives a command or user data from the other storage system via the external interface board. The external interface board connects to one of the backend board 3, the cache memory board 41, and the frontend board 2 in the other storage system, enabling data transfers.

FIG. 2 exemplifies the sequential order of data transfers in the storage controller 11 and the allotment of roles of the transfer sequencer 24/34 and the processor 44 when the storage controller 11 receives a read request (one of I/O requests) from a host computer 12 and transfers data from a drive 14 to the host computer 12. The transfer sequencer 24/34 indicates either one of the transfer sequencers 24 and 34.

In FIG. 2, the ellipses in the rectangles representing the transfer sequencer 24, the transfer sequencer 34, and the processor 44 each indicate processing that the circuits perform. As shown in FIG. 2, the transfer sequencers 24 and 24 perform the same processing. In this embodiment, the transfer sequencers 24 and 34 are provided separately from the processor 44. The transfer sequencers 24 and 34, as they are devices different from the processor 44, can perform different processing while the processor 44 is performing specific processing. The transfer sequencers 24 and 34 are different circuits independent from the processor 44, but may be mounted in the same package or the same chip.

Data held in a drive 14 is loaded to the backend buffer 35 by the drive interface LSI 31. The backend DMA 33 then transfers the data from the backend buffer 35 to the cache memory 42. Then, the frontend DMA 23 transfers the data from the cache memory 42 to the frontend buffer 25 and, lastly, the host interface LSI 21 transfers the data from the frontend buffer 25 to the host computer 12.

The processor 44 analyzes a data transfer request sent from a host computer 12 (51), locates the place (logical address) where the data is held and decides a transfer path by specifying the data transfer engines and the data transfer relay memories required for a series of processing stages (52), and allocates (areas in) the data transfer relay memories as necessary (53).

The processor 44 further creates a transfer sequence that describes transfer source addresses, transfer destination addresses, and the sequential order of transfers (54), sends the transfer sequence to the transfer sequencer (55), receives a transfer sequence result from the transfer sequencer (56), and frees (the areas in) the data transfer relay memories as necessary (57). In the following description, allocating and freeing a memory (including a buffer and a drive) means allocating and freeing a storage area in the memory.

The processor 44 operates in accordance with programs to perform the processing so that the processor 44 functions as processing modules of the above-described processing (such as a transfer request analyzing module, a transfer path deciding module, and a memory allocating module). The storage controller 11 is a controller including these processing modules.

The transfer sequencer 24/34 controls the sequence of a series of data transfers. Specifically, it evaluates whether the latest data transfer succeeded or not (61), sends a data transfer command to a data transfer engine (62), receives a data transfer status sent from the data transfer engine (63), and searches for the next transfer command at the completion of a transfer (64).

The transfer sequencer 24/34 may be made of a processor working in accordance with programs (command codes) or a hardware logical circuit. A part of the functions (processing) may be implemented by a processor (programs) and the other functions (processing) may be implemented by a hardware logical circuit. For bug fixing or design modification, it is preferable to implement the functions (processing) by a processor working in accordance with programs.

Although the processor 44 is superior in arithmetic processing centered around computing, communicating with another circuit (a hardware device) in the storage controller 11, such as sending or receiving a command, causes the processor 44 to consume long processing time compared with the substance of the processing. The processor 44 needs a context switching which enables related data to be read or written when it performs the next action upon receipt of a communication from another circuit.

Specifically, the processor 44 saves data for a stack area and local variables, which have been used in the processing up to that time, and restores different data necessary for processing data received in communication with another circuit in the stack area and the local variables. For this reason, if the processor 44 preliminarily sends details of a series of transfer sequences to the transfer sequencers 24 and 34 and the transfer sequencers 24 and 34 perform the transfers (using the transfer engines) in accordance with the details described in the transfer sequences, the processor 44 can reduce the number of its operations of monitoring transfers and the above-mentioned context switching.

Consequently, the processing time required for the processor 44 to perform a series of transfers can be significantly reduced. In the meanwhile, the transfer sequencers 24 and 34 merely instruct the data transfer engines 21, 23, 31, and 33 to transfer data in accordance with the preliminarily specified transfer sequential order and monitor results of transfers; accordingly they do not need to perform complex processing.

Accordingly, low processing capability of the transfer sequencers 24 and 34 will not be a problem. Preferably, the operating frequency of the embedded processors in the transfer sequencers 24 and 34 is lower than the operating frequency of the main processor 44, which can save the cost. The capacity of the memories used by the transfer sequencers 24 and 34 may be smaller than the capacity of the memory 45 used by the processor 44, which can also save the cost.

FIG. 3 is a sequence diagram exemplifying a series of data transfers performed by the storage controller 11 in the storage system 1 to which this invention is applied. This process is performed when data transfer becomes necessary. The occasions that require data transfer are, for example, when the storage controller 11 receives a data transfer request from a host computer 12, when data which is in cache memory 42 and has not been written in a drive 14 is required to be written to the drive 14 to solve the capacity shortage of the cache memory 42, when redundancy in data is required to be restored because of a failure in a drive 14 or recovery from a failure, and the like.

In this process, the processor 44 first decides a transfer path for user data (52). Specifically, it decides the data transfer sequencers, the data transfer engines, and the data transfer relay memories to be used for a series of transfers of user data. In the case of a write command received from a host computer 12, the processor 44 decides the host interface LSI 21, the frontend DMA 23, and the cache memory 42 for storing the data, which are to be used for transferring user data (write data) specified by the write command.

Next, the processor 44 allocates memory resources necessary for the data transfers (53). For example, in the case of a write command received from a host computer 12, it allocates the frontend buffer 23 on the frontend board 2 connected to the host computer 12 and the cache memory 42.

Then, the processor 44 creates a transfer sequence (54). Specifically, it creates data which describes transfer commands that constitute the transfer sequence, data transfer engines for processing the commands, and the order of execution of the data transfer commands. The processor 44 creates transfer sequences for the respective data transfers by the transfer sequencers 24 and 34 and sends the created data transfer sequences individually to the transfer sequencers 24 and 34 (55). In this way, a transfer sequence includes information specifying the method of transferring.

The transfer sequencer 24/34 that has received the transfer sequence selects the transfer command to be executed first and the destination transfer engine of the command from the transfer sequence. The transfer sequencer 24/34 sends the transfer command to the transfer engine to request execution of the data transfer (62).

The data transfer engine that has received the data transfer execution command from the transfer sequencer 24/34 executes a data transfer between transfer relay memories, between a host computer 12 and a transfer relay memory, or between a drive 14 and a transfer relay memory in accordance with the specified details. When the data transfer is completed or when the data transfer is failed because of some error, the transfer engine transmits a transfer status to the transfer sequencer 24/34.

When the transfer sequencer 24/34 receives the transfer status (63), it checks the contents of the transfer status to determine whether the transfer has succeeded or failed (61). If the transfer has succeeded, the transfer sequencer 24/34 obtains the next transfer command and the destination transfer engine of the command from the preliminarily received transfer sequence (64) and sends the transfer command to the transfer engine.

The transfer sequencer 24/34 (and the transfer engine) repeats the foregoing steps to perform all data transfers defined by the sequence. After a normal completion, the transfer sequencer 24/34 sends a message to the other transfer sequencer 24/34 or the processor 44 in accordance with the action at the completion described in the transfer sequence.

In FIG. 3, one of the transfer sequencers 24 and 34 sends a transfer invocation message to the other transfer sequencer 24/34 after completion of processing the received transfer sequence. The transfer sequencer 24/34 that has received the transfer invocation message performs another transfer in accordance with the preliminarily received transfer sequence. The transfer sequencer 24/34 repeats the foregoing steps until all of the transfer sequence preliminarily sent by the processor 44 is completed.

When all processing of the transfer sequence is completed, the transfer sequencer 24/34 that has executed the last data sequence sends a transfer result to the processor 44. Upon receipt of the transfer result (56), the processor 44 frees the allocated memory resources (57).

The above-described process eliminates the necessity for the processor 44 to check transfer completion statuses or to send the next transfer command during the transfers of user data. Consequently, it can reduce the amount of processing (load in data transfers) of the processor 44 and improve the processing performance of the storage system 1.

As described above, in a preferred configuration, the processor 44 makes one or more data transfer sequences (data) that define the entirety of a series of data transfers from the start point (initial point) of the series of data transfers to the final point thereof and transmits them to the transfer sequencer 24/34. In this way, creating one or more data transfer sequences defining all the transfer steps required for the required data transfers achieves less involvement of the processor 44 from the start to the end of the transfers.

Furthermore, in a preferred configuration, the processor 44 allocates all required memory resources before starting data transfer at the start point (initial point) and frees the allocated memory resources after the processing according to all the created data transfer sequences is completed (after user data is stored at the final point (the final storage area)), as described above. This configuration achieves less involvement of the processor 44 until the completion of the data transfers.

Depending on the design, the processor 44 may receive the status of completion of each transfer sequence and request execution of the next transfer sequence thereafter. Moreover, the processor 44 may free the relevant allocated memory resources at completion of each transfer sequence.

FIG. 4 exemplifies a transfer sequence 71 to be transmitted from the processor 44 to a transfer sequencer 24/34. A sequence ID 710 is information for distinguish a plurality of sequences handled by the transfer sequencer 24/34; the processor 44 assigns a transfer sequence 71 a value different from those of the other transfer sequences 71 in making the transfer sequence 71.

A transfer ID 711 is information for identifying a transfer command in a transfer sequence 71. A transfer engine 712 is information indicating a transfer engine of the transmission destination of the transfer command. This example indicates that the first command is to be transmitted to the drive interface LSI #1 (#N indicates the number of device of the same kind) and the second command is to be transmitted to the backend DMA #1. The contents of a transfer command 73 will be described in detail with reference to FIG. 6.

An action after the sequence 714 indicates the action to be performed at the completion of the transfer sequence 71. In the case where this field 714 indicates invocation of another sequence, the relevant transfer sequencer 24/34 sends a message to invoke a transfer sequence to the other sequencer. In the case where it indicates to send a message to the processor 44, the relevant transfer sequencer 24/34 sends a transfer sequence result to the processor 44. In the example of FIG. 4, the field 714 indicates to send a message to invoke another transfer sequence.

A destination 715 is information for indicating the destination of the message. In this example, it indicates the transfer sequencer 24 on the frontend board #3. Like in the example of FIG. 4, in the case where the action after the sequence 714 indicates invocation of another sequence, this field indicates the identifier of the transfer sequencer 24/34 of the destination. In the case where the action after the sequence 714 indicates transmission of a transfer sequence result to the processor 44, this field indicates the identifier of the processor 44 of the destination. A sequence ID 716 indicates the identifier of the sequence to be invoked next in the case where the action after the sequence 714 indicates invocation of another sequence.

The transfer sequence 71 in FIG. 4 is an example and the transfer sequence may have any data structure. The same applies other information used by the storage system 1 such as a transfer sequence result 72 and a sequence tracking table 242, which will be described later. For example, a data structure appropriately selected from table, list, database, and queue can store information in this embodiment or other embodiments.

FIG. 5 exemplifies a transfer sequence result 72 to be sent from a transfer sequencer 24/34 to the processor 44. A transfer sequence ID 721 is information for indicating the transfer sequence the transfer sequence result 72 corresponds to. Transfer command results 722 are information for indicating success/failure of individual transfers included in the relevant transfer sequence.

An error transfer status is information for indicating a transfer engine that has failed in transferring a command and the type of error in the case where any one of the transfer commands in the transfer sequence is failed. An error transfer engine 723 in the error transfer status indicates the identifier of the transfer engine which has developed a transfer error. This example indicates the host interface #3. An error ID 724 in the error transfer status is an identifier for indicating the type of error outputted by the transfer engine that has developed the transfer error.

FIG. 6 exemplifies a transfer command 73 to be sent from a transfer sequencer 24/34 to a transfer engine. An exchange ID 731 is an identifier for distinguishing a plurality of transfer commands 73 in the transfer engine. A source device 732 is information for indicating the source device of the data transfer requested by the transfer command.

This example indicates that the transfer source is the buffer of the drive interface #1. A source address 733 is a logical address indicating the place (the area) in the source device where the data to be transferred is held. In similar, a destination device 734 and a destination address 735 are information for indicating the destination device of the transferred data and the place to hold the transferred data in the destination device, respectively. A transfer length 736 is information for indicating the length of the data to be transferred by the transfer command.

FIG. 7 exemplifies a transfer status 74 which is outputted by a transfer engine at the completion of execution of a transfer command. An exchange ID 741 is information for indicating the transfer command 73 the transfer status 74 corresponds to. A transfer result 742 is information for indicating success/failure of the transfer command 73. An error ID 743 is an identifier for indicating the cause of the failure in the case where the transfer has failed.

FIG. 8 is a flowchart illustrating an example of processing of the processor 44 when it has received a command (typically, a read command or a write command) from a host computer 12. Upon receipt of a command from a host computer 12, the processor 44 decides a transfer path (S8111). Specifically, the processor 44 decides a source device and a destination device, relay memories, and transfer engines to use. Then, the processor 44 determines whether to use a transfer sequencer 24/34 in accordance with predetermined criteria (S8112).

For example, if the processor 44 has remaining processing power, and/or if the transfer sequencer 24/34 has little remaining processing power because of high usage, the processor 44 determines not to use the transfer sequencer 24/34. Specifically, the processor 44 refers to the usage ratio of the processor 44 and/or the usage of the transfer sequencer 24/34 to determine whether to use the transfer sequencer 24/34.

For example, if the usage ratio of the processor 44 is less than a predetermined threshold and/or if the usage ratio of the transfer sequencer 24/34 is more than a predetermined threshold, effects for performance improvement may not be expected as the capability of the transfer sequencer is insufficient. For this reason, the processor 44 determines not to use the transfer sequencer 24/34. Typically, the values of the two thresholds are different. If a series of data transfers involves both of the transfer engines controlled by the transfer sequencers 24 and 34, the processor 44 determines whether to use one of them or whether to use both of them.

Moreover, in a preferable configuration, the processor 44 analyzes an I/O command (read command or write command) from a host computer 12 to determine whether to use the transfer sequencer 24/34 depending on the storing location of the target user data (read data or write data) of the command.

Specifically, if the locations that stores the target user data are separated in a plurality of storage devices, it might be necessary to make and combine transfer commands for the individual storage devices in order to transfer all of the data. To support all of such complicated cases, the transfer sequencer 24/34 needs a complex configuration and a large amount of memory. To avoid such a situation, the processor 44 decides not to use the transfer sequencer 24/34. One storage device is defined with one address space and a transfer engine accesses a storage area provided by one storage device in an address space. Separate storage devices provide separate address spaces. Since such a case is generally rare, the effect on performance caused by nonuse of the transfer sequencer 24/34 is small.

For example, if the source (the storing location of the target data) specified by a read command from a host computer 12 is located at a plurality of separate cache memories 42 or drives 14, or if the destination (the location for storing the target data) specified by a write command from a host computer 12 is located at a plurality of separate cache memories 42, the processor 44 decides not to use the transfer sequencer 24/34. The reason is the same as that in the foregoing case where the data is separated in a plurality of storage devices.

More preferably, if the source or the destination of the user data is not in a continuous area (areas at consecutive logical addresses), or is in discrete areas, the processor 44 decides not to use the transfer sequencer 24/34. The reason is the same as that in the foregoing case where the data is separated in a plurality of storage devices. Still further, if a continuous area cannot be allocated in a relay memory because of a long transfer length, it is preferable that the processor 44 decide not to use the transfer sequencer 24/34. The reason is also the same as that in the foregoing case where the data is separated in a plurality of storage devices.

In a preferable configuration, the processor 44 may determine whether to use the transfer sequencer 24/34 in consideration of the relationship between the free area of the buffer and the transfer data length. If the free space of the frontend buffer 25 or the backend buffer 35 is not sufficient for the transfer length, for example, if the difference between them is less than a predetermined threshold, the processor 44 decides not to use the transfer sequencer 24/34. Since a transfer sequencer occupies a buffer for a long time, if the effect of long-time allocation of the buffer is significant, nonuse of the transfer sequencer achieves effective utilization of the buffer. In addition to this, it is preferable that the processor 44 decide not to use the transfer sequencer 24/34 if another access is expected to occur to the same data. In transferring data, exclusion that eliminates an occurrence of another data access is usually carried out to avoid discrepancy in data. Using a transfer sequencer in such a situation leads to extending the time of exclusion of access to the data, so that the other actions are suspended for a long time. Nonuse of the transfer sequencer enables fragmentation of the time of exclusion to achieve less effect to the other actions.

These circumstances require processing different from simple data transfer between memories (including storage media in drives). For example, storing data in separate cache memory devices requires separating the user data received from a host computer 12 into a plurality of parts and storing them into separate cache memories. To simplify designing the configuration (processing) of the transfer sequencer 24/34, it is preferable that the processor 44 execute such exceptional processing.

The processor 44 may refer to predetermined one or more of the plurality of the foregoing criteria to determine whether to use the transfer sequencer 24/34. In the case of using a plurality of criteria, if any one of the criteria meets a requirement for nonuse, the processor 44 typically transfers data without using the transfer sequencer 24/34. The processor 44 may determine whether to use the transfer sequencers 24 and 34 individually. Alternatively, if one of the transfer sequencers 24 and 34 is not used, it may decide not to use the other transfer sequencer 24/34.

To use a transfer sequencer, the processor 44 first allocates all of the relay memories on the transfer path. In other words, the processor 44 allocates relay memories such as the frontend buffer 25, the backend buffer 35, and a cache memory 42 on the transfer path (S8113).

Next, the processor 44 makes transfer commands and a transfer sequence(s) (S8114). Specifically, the processor 44 creates transfer commands to use the transfer engines decided at S8111 so that the memory areas allocated at S8113 become sources/destinations. Then, it makes a transfer sequence(s) with the created transfer commands.

Next, the processor 44 sends the created transfer sequence(s) to the transfer sequencer 24 and/or the transfer sequencer 34 and instructs the transfer sequencer at the start point of transfer to execute the transfer (S8115). The processor 44 waits for a result from the transfer sequencer at the final transfer destination (S8116) and lastly frees the buffers allocated at S8113 (S8117) to terminate the processing.

On the other hand, if the processor 44 decides not to use either the transfer sequencer 24 or the transfer sequencer 34 at S8112, it performs data transfers one by one at individual stages without using the transfer sequencer. Specifically, the processor 44 first allocates a memory required for the next data transfer (S8118). Then, it creates a transfer command required for the next transfer (S8119).

Next, the processor 44 sends the created transfer command to the transfer engine (S8120) and waits for a transfer status sent from the transfer engine (S8121). Upon receipt of the transfer status, the processor 44 checks the success of the transfer (S8122) and frees the buffer used in this transfer (S8123). The processor 44 determines whether all the necessary data transfers have been performed (S8124) and if any data transfer is left (N at S8124), the processor 44 returns to S8118. If all data transfers have been completed (Y at S8124), the processor 44 terminates the processing.

FIG. 9 exemplifies a configuration of a transfer sequencer 24. The transfer sequencer 24 includes an embedded processor 241 to perform the processes shown in FIG. 2, a sequence tracking table 242 for storing the status of a transfer sequence being processed, and a sequence table 243 for storing the details of the transfer sequence. At least a part of the functions of the transfer sequencer 24 may be implemented by a logical circuit different from the embedded processor 241.

The transfer sequencer 24 further includes an embedded memory, for example, and stores a program to be executed by the embedded processor 241 and data including the sequence tracking table 242 and the sequence table 243 in the memory. The transfer sequencer 24 may use the buffer 25. These data (including programs) are loaded from a non-volatile memory (not shown) in the storage controller 11 or a non-volatile storage area of a drive 14. The transfer sequencer 34 mounted on the backend board 3 has the same structure and functions as the transfer sequencer 24.

FIG. 10 exemplifies the sequence tracking table 242. The sequence tracking table 242 has fields for storing transfer phases 2422 for indicating the phases to which the transfers have progressed with respect to individual sequence IDs 2421 for identifying a plurality of transfer sequences.

FIG. 11 is a flowchart exemplifying processing performed by a transfer sequencer 24/34. The transfer sequencer 24/34 repeats this processing for the sequence control of data transfers in place of the processor 44.

As illustrated in the flowchart of FIG. 11, the transfer sequencer 24/34 first registers a transfer sequence from the processor 44. Specifically, the transfer sequencer 24/34 first checks whether a transfer sequence has sent from the processor 44 (S8211). In the case where a new transfer sequence has arrived (Y at S8212), the transfer sequencer 24/34 adds the transfer sequence to the transfer sequence table 243 (S8213).

The transfer sequencer 24/34 sends the first transfer command to the transfer engine specified by the transfer sequence (S8214). On the other hand, in the case where a transfer sequence has not arrived at S8212, the transfer sequencer 24/34 proceeds to S8215. Next, the transfer sequencer 24/34 controls transfer engines such as the DMA 23/33, and the interface LSI 21/31.

Specifically, the transfer sequencer 24/34 checks whether a transfer status from a transfer engine has arrived (S8215). In the case where no status has arrived (N at S8216), the transfer sequencer 24/34 terminates the processing.

In the case where a status has arrived (Y at S8216), the transfer sequencer 24/34 analyzes the status to check whether the relevant transfer has succeeded or failed (S8217). In the case where it has succeeded (Y at S8218), the transfer sequencer 24/34 searches the transfer sequence table 243 for the transfer command to be executed next (S8219).

In the case where the next command is present, namely in the case where the finished data transfer is not the last one in the sequence (N at S8220), the transfer sequencer 24/34 sends the next command to the transfer engine specified by the transfer sequence (S8221). Then, it updates the transfer command under processing in the transfer tracking table 242 to the command which has just started to be executed (S8222) and terminates the processing.

On the other hand, in the case where the command which has just finished is the last command (Y at S8220), the transfer sequencer 24/34 checks the action after the sequence 714 described in the transfer sequence (S8223). If the action is invocation of another sequence, the transfer sequencer 24/34 sends a sequence invocation message to the specified transfer sequencer (S8224) and terminates the processing.

On the other hand, in the case where the action after the sequence 714 indicates transmission of a message (result) to the processor instead of invocation of another sequence, the transfer sequencer 24/34 sends a transfer sequence result to the processor 44 (S8225) and terminates the processing. In the meanwhile, in the case where the transfer sequencer 24/34 has found that the transfer is failed at S8218, it sends a transfer sequence result to the processor 44 and terminates the processing.

As described above, the transfer sequencer 24/34 is provided to allow the processor 44 to preliminarily send the transfer sequencer 24/34 a transfer sequence, so that the transfer sequencer 24/34 can perform a series of data transfers in accordance with the command from the processor 44. Consequently, the processor 44 does not need to intervene in every data transfer (every transfer by a transfer engine) during a series of data transfers, so that the amount of processing of the processor 44 decreases. As a result, the processor 44 becomes able to process other tasks so that the performance of the storage system 1 is improved.

In this embodiment, the transfer sequencers 24 and 34 are mounted on different boards 2 and 3, respectively. The transfer sequencers 24 and 34 control the respective transfer engines on the boards 2 and 3.

Namely, the transfer sequencer 24 on the frontend board 2 controls the frontend DMA 23 and the host interface LSI 21. The transfer sequencer 34 on the backend board 3 controls the backend DMA 33 and the drive interface LSI 31. This configuration in which the transfer sequencer 24/34 controls only the transfer engines on the same board achieves easy location of the location of an error. Depending on the design, the transfer sequencers may control transfer engines on different boards.

Second Embodiment

A second embodiment exemplifies processing an I/O request (a read command or a write command) utilizing a transfer sequencer 24/34 as appropriate when the storage controller 11 has received an I/O request from a host computer 12. FIG. 12 is a flowchart illustrating I/O processing performed by the processor 44 when the storage controller 11 has received an I/O request from a host computer 12.

Upon receipt of an I/O request from a host computer 12, the processor 44 analyzes the type of the command (S8311). Specifically, in the case where the type of command is a read command (READ at S8311), the processor 44 checks whether the requested data is in the cache memory 42 (S8312).

Specifically, the processor 44 searches a cache directory that manages the data held in the cache memory 42 and checks whether the data of the volume number and at the address requested by the host computer 12 is in the cache memory 42.

In the case where the data is in the cache memory 42 (Y at S8312), the processor 44 determines whether to use the transfer sequencer 24 (S8313). For the criteria for using the transfer sequencer 24, as previously described, a part or all of that the requested data is held in a continuous area in the cache memory 42, that the frontend buffer 25 has a sufficient free space, that another process to access the same data does not exist, and the like, may be used.

In the case of using the data transfer 24 (Y at S8313), the processor 44 performs read hit processing 84 with the transfer sequencer 24. On the other hand, in the case without using the transfer sequencer 24 (N at S8313), the processor 44 performs read hit processing 85 without the transfer sequencer 24.

On the other hand, if the requested data is not in the cache memory 42 (N at S8312), the processor 44 determines whether to use the transfer sequencers 24 and 34 (S8316). For the criteria for using the transfer sequencers 24 and 34, a part or all of that the requested data is held in a continuous area in a drive 14, that the frontend buffer 25 and the backend buffer 35 have sufficient free spaces, that another process to access the same data does not exist, and the like, may be used.

In the case of using the transfer sequencers 24 and 34 (Y at S8316), the processor 44 performs read miss processing 86 with the transfer sequencers 24 and 34. On the other hand, in the case without using the transfer sequencer 24 or 34 (N at S8316), the processor 44 performs read miss processing 87 without the transfer sequencer 24 or 34.

At S8311, if the type of the host command is a write command (WRITE at S8313), the processor 44 determines whether to use the transfer sequencer 24 (S8319). The criteria for using the transfer sequencer 24 are that the frontend buffer 25 has a sufficient free space, that another process to access the same data does not exist, that the addresses in the destination cache memory 42 are consecutive, and the like.

In the case of using the transfer sequencer 24 (Y at S8319), the processor 44 performs frontend write processing 88 with the transfer sequencer 24. On the other hand, in the case without using the transfer sequencer 24 (N at S8319), the processor 44 performs frontend write processing 89 without the transfer sequencer 24.

FIG. 13 illustrates data transfers performed by transfer engines (a host interface LSI 21 and a DMA 23) in the read hit processing 84 with a transfer sequencer 24 or the read hit processing 85 without a transfer sequencer 24.

In the read hit processing 84/85, the frontend DMA (FE DMA) 23 first performs a data transfer from the cache memory 42 to the frontend buffer (FE BUF.) 25. Specifically, the frontend DMA 23 issues a read request to the cache memory 42. The frontend DMA 23 receives response data from the cache memory 42 and writes it in the frontend buffer 25.

Next, the host interface LSI 21 transfers data from the frontend buffer 25 to the host computer 12. Specifically, the host interface LSI 21 issues a read request to the frontend buffer 25. The host interface LSI 21 receives response data from the frontend buffer 25 and forwards it to the host computer 12.

FIG. 14 exemplifies the read hit processing 84 with a transfer sequencer 24. This process corresponds to S8113 to S8117 in FIG. 8. In this process, the processor 44 first allocates the frontend buffer 25 (S841), which corresponds to S8113 in FIG. 8.

Next, the processor 44 creates a command for the frontend DMA 23 to transfer the requested data from the cache memory 42 holding the data to the frontend buffer 25 allocated at S841 (S842).

Then, the processor 44 makes a transfer command for the host interface LSI 21 to forward the data from the frontend buffer 25 to the host computer 12 (S843). The processor 44 makes a transfer sequence based on these transfer commands to make the frontend DMA 23 and the host interface LSI 21 operate sequentially (S844).

The processor 44 sends the created transfer sequence to the frontend transfer sequencer 24 (S845). The processor 44 waits for a response from the frontend transfer sequencer 24 (S846). Upon receipt of the response from the frontend transfer sequencer 24, the processor 44 checks that the transfer sequence has succeeded (S847), frees the frontend buffer 25 (S848), and terminates the processing.

FIG. 15 exemplifies the read hit processing 85 without a transfer sequencer 24. This process corresponds to S8118 to S8124 in FIG. 8. In this process, the processor 44 first allocates the frontend buffer 25 (S850). The processor 44 makes a command for the frontend DMA 23 to transfer the requested data from the cache memory 42 holding the data to the frontend buffer 25 allocated at S850 (S851).

Next, the processor 44 sends the created transfer command to the frontend DMA 23 (S852). The processor 44 waits for a transfer status sent by the frontend DMA 23 (S853). Upon receipt of the transfer status, the processor 44 checks the status indicating the success of the transfer (S854).

Next, the processor 44 creates a transfer command for the host interface LSI 21 to transfer the data from the frontend buffer 25 to the host computer 12 (S855). The processor 44 sends the created command to the host interface LSI 21 (S856).

The processor 44 waits for a transfer status sent by the host interface LSI 21 (S857). Upon receipt of the transfer status, the processor 44 checks the status indicating the success of the transfer (S858). The processor 44 frees the allocated frontend buffer 25 (S859) to terminate the processing.

FIG. 16 illustrates data transfers processed by transfer engines (a drive interface LSI 31, a backend DMA (BE DMA) 33, a frontend DMA (FE DMA) 23, and a host interface LSI 21) in the read miss processing 86 with transfer sequencers 24 and 34 or the read miss processing 87 without a transfer sequencer 24 or 34.

In the read miss processing 86/87, the drive interface LSI 31 first transfers data from the drive 14 to the backend buffer (BE BUF.) 35. Specifically, the drive interface LSI 31 issues a read command to the drive 14. The drive interface LSI 31 receives response data from the drive 14 and writes it into the backend buffer 35.

Next, the backend DMA 33 transfers the data from the backend buffer 35 to the cache memory 42. Specifically, the backend DMA 33 issues a read request to the backend buffer 35. The backend DMA 33 receives the response data from the backend buffer 35 and writes it into the cache memory 42.

Next, the frontend DMA 23 transfers the data from the cache memory 42 to the frontend buffer 25. Specifically, the frontend DMA 23 issues a read request to the cache memory 42. The frontend DMA 23 receives the response data from the cache memory 42 and writes it into the frontend buffer 25.

Lastly, the data is transferred from the frontend buffer 25 to the host computer 12. Specifically, the host interface LSI 21 issues a read request to the frontend buffer 25. The host interface LSI 21 receives the response data from the frontend buffer 25 and forwards it to the host computer 12.

FIG. 17 exemplifies the read miss processing 86 with transfer sequencers 24 and 34. This process corresponds to S8113 to S8117 in FIG. 8. In this process, the processor 44 first allocates relay memories necessary for a series of transfers. Specifically, the processor 44 locates the backend board 3 connected to the drive 14 from which the user data specified by the read command is to be read and allocates the backend buffer 35 thereon (S8611).

Next, the processor 44 allocates a free area in the cache memory 42 for the area to store the requested data (S8612). Similarly, the processor 44 allocates the frontend buffer 25 (S8613). Through the foregoing steps, the relay memories necessary for the series of transfers can be allocated.

Next, the processor 44 creates transfer commands and transfer sequences necessary for the transfers. Specifically, the processor 44 creates a transfer command for the drive interface LSI 31 to transfer the data from the drive 14 to the backend buffer 35 (S8614). The processor 44 then creates a transfer command for the backend DMA 33 to transfer the data from the backend buffer 35 to the cache memory 42 (S8615).

Next, the processor 44 creates a transfer command for the frontend DMA 23 to transfer the data from the cache memory 42 to the frontend buffer 25 (S8616). The processor 44 creates a transfer command for the host interface LSI 21 to transfer the data from the frontend 25 to the host computer 12 (S8617).

Next, using the created transfer commands of the drive interface LSI 31 and the backend DMA 33, the processor 44 makes a transfer sequence to transfer the data in this order (S8618). The processor 44 sets the next action after the completion of the transfer sequence to the invocation of the transfer sequence for the frontend transfer sequencer 24.

Next, using the transfer commands of the frontend DMA 23 and the host interface LSI 21, the processor 44 creates a transfer sequence for transferring the data in this order (S8619). Through the foregoing steps, creation of transfer commands and transfer sequences has been completed.

The processor 44 sends the transfer sequence created at S8619 to the frontend transfer sequencer 24 (S8620). Next, the processor 44 sends the transfer sequence created at S8618 to the backend transfer sequencer 34 (S8621). The processor 44 instructs the backend transfer sequencer 34 to invoke the transfer sequence (S8622).

The processor 44 waits for a result of transfers sent by the frontend transfer sequencer 24 (S8623). Upon arrival of the result of transfers, the processor 44 analyzes the result of transfers to check that the processing of the transfer sequences has succeeded (S8624). The processor 44 frees the frontend buffer 25 previously allocated (S8625) and frees the backend buffer 35 in the same way (S8626) to terminate the processing.

FIG. 18 exemplifies the read miss processing 87 without a transfer sequencer 24 or 34. This process corresponds to S8118 to S8124 in FIG. 8. This process first transfers the data from a drive 14 to a backend buffer 35. Specifically, the processor 44 allocates the backend buffer 35 (S8711). Next, the processor 44 creates a transfer command for the drive interface LSI 31 to transfer the data from the drive 14 to the backend buffer 35 (S8712).

Next, the processor 44 sends the created command to the drive interface LSI 31 (S8713). The processor 44 waits for a status of the result of execution from the drive interface LSI 31 (S8714). Upon receipt of the status, the processor 44 analyzes it to check that the transfer has succeeded (S8715).

Next, the processor 44 transfers the data from the backend buffer 35 to the cache memory 42. Specifically, the processor 44 first allocates the cache memory 42 (S8716). Next, the processor 44 creates a transfer command for the backend DMA 33 to transfer the data from the backend buffer 35 to the cache memory 42 (S8717).

Next, the processor 44 sends the created command to the backend DMA 33 (S8718). The processor 44 waits for an execution status sent by the backend DMA 33 (S8719). Upon receipt of the status, the processor 44 analyzes the status to check that the transfer has succeeded (S8720). Then, the processor 44 frees the backend buffer 35 (S8721).

Next, the processor 44 transfers the data from the cache memory 42 to the frontend buffer 25. Specifically, the processor 44 first allocates the frontend buffer 25 (S8722). Next, the processor 44 creates a transfer command for the frontend DMA 23 to transfer the data from the cache memory 42 to the frontend buffer 25 (S8723).

Next, the processor 44 sends the created command to the frontend DMA 23 (S8724). The processor 44 waits for a status of the result of execution sent by the frontend DMA 23 (S8725). Upon receipt of the status, the processor 44 analyzes the status to check that the transfer has succeeded (S8726).

Lastly, the processor 44 transfers the data from the frontend buffer 25 to the host computer 12. Specifically, the processor 44 first creates a transfer command for the host interface LSI 21 to transfer the data from the frontend buffer 25 to the host computer 12 (S8727).

The processor 44 sends the created command to the host interface LSI 21 (S8728). Then, the processor 44 waits for a status of the result of execution sent by the host interface LSI 21 (S8729). Upon receipt of the status, the processor 44 analyzes the status to check that the transfer has succeeded (S8730). Lastly, the processor 44 frees the frontend buffer 25 (S8731) to terminate the processing.

FIG. 19 illustrates data transfers performed by transfer engines (a host interface LSI 21 and a frontend DMA 23) in the frontend write processing 88 with a transfer sequencer 24 or the frontend write processing 89 without a transfer sequencer 24.

In the frontend write processing 88/89, the host interface LSI 21 first transfers data from a host computer 12 to the frontend buffer 25. Specifically, the host interface LSI 21 receives user data sent by the host computer 12. The host interface LSI 21 writes the data to the place in the frontend buffer 25 preliminarily specified by the transfer command.

Next, the frontend DMA 23 transfers the data from the frontend buffer 25 to cache memories 42. Specifically, the frontend DMA 23 issues a read request to the frontend buffer 25.

The frontend DMA 23 receives the data forwarded by the frontend buffer 25 and writes it into the cache memories 42. On this occasion, the data may not be able to be read because of an error in the data sent from the host computer 12 or a failure in the power supply or the cache memory board 41. Hence, in writing data, it is preferable to write the same data to two cache memories 42 to prevent data loss in case that a failure occurs to either one and it is unreadable therefrom.

FIG. 20 exemplifies the frontend write processing 88 with a transfer sequencer 24. This process corresponds to S8113 to S8117 in FIG. 8. In this process, the processor 44 first allocates relay memories required for a series of transfers.

Specifically, the processor 44 first allocates the frontend buffer 25 (S881). Next, the processor 44 checks whether the cache memories 42 for storing write data from the host computer 12 have already been allocated, and if they have not been allocated yet, it allocates the cache memories 42 (S882). Through these steps, transfer relay memories are allocated.

Next, the processor 44 creates transfer commands and a transfer sequence. Specifically, the processor 44 makes a transfer command for the host interface LSI 21 to transfer the data from the host computer 12 to the frontend buffer 25 (S883).

Next, the processor 44 creates transfer commands for the frontend DMA 23 to transfer the data from the frontend buffer 25 to the two cache memories 42 (S884). The processor 44 makes a transfer sequence based on the created transfer commands to perform the transfer by the host interface LSI 21 and the transfers by the frontend DMA 23 in this order (S885). Through these steps, creating transfer commands and a transfer sequence is complete.

Next, the processor 44 sends the created transfer sequence to the frontend transfer sequencer 24 to instruct it to execute the transfer sequence (S886). The processor 44 then waits for a response from the transfer sequencer 24 (S887). Upon receipt of the response, the processor 44 checks that the execution of the transfer sequence has succeeded (S888) and frees the frontend buffer 25 (S889). The processor 44 terminates the processing.

FIG. 21 exemplifies the front end write processing 89 without a transfer sequencer. This process corresponds to S8118 to S8124 in FIG. 8. In this process, the processor 44 first transfers data from the host computer 12 to the frontend buffer 25.

Specifically, the processor 44 first allocates the frontend buffer 25 (S890). Next, the processor 44 makes a transfer command for the host interface LSI 21 to transfer the data from the host computer 12 to the frontend buffer 25 (S891). The processor 44 transfers the created command to the host interface LSI 21 (S892).

The processor 44 waits for a status of the result of execution sent by the host interface LSI 21 (S893). Upon receipt of the status, the processor 44 analyzes the status to check that the transfer has succeeded (S894). Through these steps, the data transfer from the host computer 12 to the frontend buffer 25 is completed.

Next, the processor 44 transfers the data from the frontend buffer 25 to the cache memories 42. Specifically, the processor 44 first makes transfer commands for the frontend DMA 23 to transfer the data from the frontend buffer 25 to the cache memories 42 (S895). Then, the processor 44 sends the created commands to the frontend DMA 23 (S896).

The processor 44 waits for statuses of the results of execution sent by the frontend DMA 23 (S897). Upon receipt of the statuses, the processor 44 analyzes the statuses to check that the transfers have succeeded (S898). Lastly, the processor 44 frees the allocated frontend buffer 25 (S899) to terminate the processing.

FIG. 22 illustrates an example of the process of destaging 90 to write user data in the cache memory 42 written by the host computer 12 to a drive 14. This process is executed when the free space of the cache memory 42 has become short or when the storage system 1 has remaining processing power, if user data written by the host computer 12 is in the cache memory 42.

In this process, the processor 44 checks the RAID level of the drive 14 of the write target (S901). In the case of RAID 1 (RAID 1 at S901), the processor 44 determines whether to use the transfer sequencers 34 (S902).

The processor 44 checks whether the criteria to use the transfer sequencer 34 are satisfied; the criteria may include a part or all of that the data to be destaged is held in a continuous area in the cache memory 42, that the data is not to be stored in a plurality of separate drives 14, that the storage area in the drive 14 is continuous, that the backend buffers 35 have sufficient free spaces, that no other process to access the data exists, and that no failure has occurred to the other drive of the RAID group to which the write target drive 14 belongs.

In the case of using the transfer sequencers 34 (Y at S902), the processor 44 performs a RAID 1 destaging 91 with the transfer sequencers 34. On the other hand, in the case without using a transfer sequencer 34 (N at S902), the processor 44 performs a RAID 1 destaging 92 without a transfer sequencer 34. At S901, in the case where the RAID level of the write target drive 14 is RAID 5 (RAID 5 at S901), the processor 44 determines whether to use the transfer sequencers 34 (S905).

The processor 44 checks whether the criteria to use the transfer sequencers 34 are satisfied; the criteria may include a part or all of that data to be destaged is held in a continuous area in the cache memory 42, that the data is not to be stored in a plurality of separate drives 14, that the storage area in the drive 14 is continuous, that the backend buffers 35 have sufficient free spaces, that no other process to access the data exists, and that no failure has occurred to the other drive of the RAID group to which the write target drive 14 belongs.

In the case of using the transfer sequencers 34 (Y at S905), the processor 44 performs a RAID 5 destaging 93 with the transfer sequencers 34. On the other hand, in the case without using a transfer sequencer 34 (N at S905), the processor 44 performs a RAID 5 destaging 94 without a transfer sequencer 34.

FIG. 23 illustrates data transfers performed by transfer engines in the RAID destaging 91 with transfer sequencers 34 or the RAID 1 destaging 92 without a transfer sequencer 34.

The RAID 1 destaging 91/92 writes data in the cache memory 42 to two drives 14 (DRIVE 1 and DRIVE 2), respectively. In a usual configuration, the drive 1 (14) and the drive 2 (14) are connected to different drive interface LSIs 131 on different backend boards 3; accordingly, the backend DMAs 33 and the backend buffers 35 to be used for the transfers are different.

First, the first backend DMA (BE 1 DMA) 33 transfers the data from the cache memory 42 to the first backend buffer (BE 1 BUF.) 35, which means the first backend DMA 33 issues a read request to the cache memory 42 and writes the received response data into the first backend buffer 35.

Next, the first drive interface LSI (DRIVE I/F 1 LSI) 31 transfers the data from the first backend buffer 35 to the first drive (DRIVE 1) 14. Similarly, the first drive interface LSI 31 issues a read request to the first backend buffer 35, receives the data, issues a write command to the first drive 14, and writes the received data. Through these steps, the write to the first drive 14 is completed.

Next, in the same way, the RAID 1 destaging 91/92 performs a write to the second drive (DRIVE 2) 14. The second backend DMA (BE 2 DMA) 33, the second backend buffer (BE 2 BUF.) 35, the second drive interface LSI (DRIVE I/F 2 LSI) 31 performs the same processing as that described above to write data to the second drive 14.

FIG. 24 exemplifies the RAID 1 destaging 91 with transfer sequencers. This process corresponds to S8113 to S8117 in FIG. 8. In this process, the processor 44 first allocates relay memories required for a series of transfers. Specifically, the processor 44 allocates the first backend buffer 35 to write to the first drive 14 (S9111). Next, the processor 44 allocates the second backend buffer 35 (S9112) in the same way. Through these steps, the allocating transfer relay memories is completed.

Next, the processor 44 creates transfer commands and transfer sequences. Specifically, first, the processor 44 makes the first transfer sequence for destaging the data from the cache memory 42 to the first drive 14 (S9113). Next, the processor 44 makes the second transfer sequence for destaging the data to the second drive 14 (S9114). Details of these processes will be described with reference to FIG. 30. Next, the processor 44 sets the next action after the completion of the first transfer sequence at S9113 to the invocation of the second transfer sequence (S9115). Through these steps, the creating transfer sequences is completed.

Next, the processor 44 sends the first transfer sequence created at S9113 to the first backend transfer sequencer 34 on the first backend board 3 connected to the first drive 14 (S9116). In the same way, the processor 44 sends the second transfer sequence created at S9114 to the second backend transfer sequencer 34 on the second backend board 3 connected to the second drive 14 (S9117).

Then, the processor 44 instructs the transfer sequencer 34 to which the first sequence has been sent at S9116 to invoke the transfer sequence (S9118). The processor 44 waits for a status indicating that the second transfer sequence is complete from the transfer sequencer 34 (S9119). Upon receipt of the transfer status, the processor 44 checks that the execution of the transfer sequences have succeeded (S9120), frees the first backend buffer 35 (S9121) and frees the second backend buffer 35 (S9122). Then, the processor 44 terminates its processing.

FIG. 25 exemplifies the RAID 1 destaging 91 without a transfer sequencer 34. This process corresponds to S8118 to S8124 in FIG. 8. In this process, first, the processor 44 allocates the first backend buffer 35 on the first backend board 3 connected to the first drive 14 (S921) to destage the data to the first drive 14. The processor 44 destages the data from the cache memory 42 to the first drive 14 (S922). Details of this process will be described with reference to FIG. 31. The processor 44 frees the first backend buffer 35 (S923).

Similarly, the processor 44 allocates the second backend buffer 35 on the second backend board 3 connected to the second drive 14 to destage the data to the second drive 14 (S924). The processor 44 destages from the cache memory 42 to the second drive 14 (S925). Then, the processor 44 frees the second backend buffer 35 (S926) to terminate the processing.

FIG. 26 illustrates data transfers performed by transfer engines in the RAID 5 destaging 93 with transfer sequencers or the RAID 5 destaging 94 without a transfer sequencer.

The RAID 5 destaging 93/94 writes updated data into two drives 14 of the drives 14 that constitute a RAID 5 group: a drive 14 for storing data (hereinafter, data drive) and a drive 14 for storing a parity (hereinafter, parity drive). In FIG. 26, the data drive is denoted by DRIVE (D.), the parity drive is denoted by DRIVE (P.)

This process first loads data before the update (hereinafter, old data) from the data drive 14 to the cache memory 42. Specifically, the first drive interface LSI (D. I/F 1 LSI) 31 connected to the data drive (DRIVE (D.)) 14 loads the old data to the first backend buffer (BE 1 BUF.) 35 on the same board. Specifically, the first drive interface LSI 31 issues a read command to read the old data to the data drive 14 and writes the received data into the first backend buffer 35.

Next, the first backend DMA (BE 1 DMA) 33 provided on the same backend board 3 as the first backend buffer 35 transfers the old data in the first backend buffer 35 to the cache memory 42. Specifically, the backend DMA 33 issues a read request to the first backend buffer 35 and writes the received old data into the cache memory 42.

Similarly, the RAID 5 destaging 93/94 loads the parity before the update (hereinafter, old parity) stored in the parity drive (DRIVE (P.)) 14 to the cache memory 42. The method is the same as the loading user data except for using the second drive interface LSI (D. I/F 2 LSI) 31, the second backend buffer (BE 2 BUF.) 35 and the second backend DMA (BE 2 DMA) 33.

Next, the RAID 5 destaging 93/94 generates a parity after the update (hereinafter, new parity) from the data that is written by the host and originally present in the cache memory 42 (hereinafter, new data), the loaded old data, and the old parity. Specifically, a parity generator (PARITY GEN.) 36 issues a read command to read the old data, the old parity, and the new data to the cache memory 42. The parity generator 36 performs XOR calculation on the three received data to generate a new parity, and writes it into the cache memory 42.

Then, the RAID 5 destaging 93/94 writes the new data from the cache memory 42 to the data drive 14. Specifically, the first backend DMA 33 issues a read request to the cache memory 42 and writes the received new data into the first backend buffer 35. Next, the first drive interface LSI 31 issues a read request to the first backend buffer 35 and issues a write command to write the received new data to the data drive 14.

Lastly, the RAID 5 destaging 93/94 writes the old parity from the cache memory 42 to the parity drive 14. The method is the same as writing the new data except for using the second backend DMA 33, the second backend buffer 35, and the second drive interface LSI 31.

FIG. 27 exemplifies the RAID 5 destaging 93 with transfer sequencers 34. This process corresponds to S8113 to S8117 in FIG. 8. In this process, the processor 44 first allocates transfer relay memories. Specifically, the processor 44 allocates the first buffer area in the first backend buffer (BE 1 BUF.) 35 to load the old data from the data drive 14 (S9311). Next, the processor 44 allocates the second buffer area in the second backend buffer (BE 2 BUF.) 35 to load the old parity from the parity drive 14 (S9312).

Similarly, the processor 44 allocates the third buffer area in the first backend buffer 35 to write (destage) new data from the cache memory 42 to the data drive 14 (S9313). The processor 44 allocates the fourth buffer area in the second backend buffer 35 to write a new parity from the cache memory 42 to the parity drive 14 (S9314). Through these steps, the allocating transfer relay memories is completed.

Next, the processor 44 creates transfer commands and transfer sequences. Specifically, the processor 44 creates the first transfer sequence for staging the old data from the data drive 14 to the cache memory 42 (S9315). Next, the processor 44 creates the second transfer sequence for staging the old parity from the parity drive 14 to the cache memory 42 (S9316).

Next, the processor 44 creates the third sequence for the parity generator 36 to generate a new parity from the old data, the old parity, and the new data (S9317). This sequence is composed of only data transfer commands that are for the parity generator 36 to generate a parity. Next, the processor 44 makes the fourth transfer sequence for destaging the new data from the cache memory 42 to the data drive 14 (S9138). The processor creates the fifth transfer sequence for destaging the new parity from the cache memory 42 to the data drive 14 (S9319).

The processor 44 sets the action at the completion of the first transfer sequence to the invocation of the second transfer sequence (S9320), the action at the completion of the second transfer sequence to the invocation of the third transfer sequence (S9321), the action at the completion of the third transfer sequence to the invocation of the fourth transfer sequence (S9322), and the action at the completion of the fourth transfer sequence to the invocation of the fifth transfer sequence (S9323). Through these steps, creating the transfer sequences is completed. Details of creating transfer sequences for staging and destaging will be described later with reference to FIGS. 29 and 30.

The processor 44 sends the individual created transfer sequences to the relevant backend transfer sequencers 34 (S9324). Specifically, the first and the fourth transfer sequences are sent to the first transfer sequencer 34 on the first backend board 3 connected to the data drive 14. The second and the fifth transfer sequences are sent to the second transfer sequencer 34 on the second backend board 3 connected to the parity drive 14.

The third transfer sequence is sent to the transfer sequencer 34 on the backend board 3 on which the parity generator 36 to be used for this parity generation is disposed. It should be noted that the parity generator 36 and the transfer sequencer to operate the parity generator 36 may be placed at a different location such as on the cache memory board 41.

Next, the processor 44 instructs the first backend transfer sequencer 34 to invoke the first transfer sequence (S9325). The processor 44 waits for the arrival of the status that reports the completion of the fifth transfer sequence (S9326). Upon receipt of the status, the processor 44 checks that the transfers have succeeded (S9327), frees the allocated first to fourth buffer areas (S9328), and terminates the processing.

FIG. 28 exemplifies the RAID 5 destaging 94 without a transfer sequencer. This process corresponds to S8118 to S8124 in FIG. 8. In this process, the processor 44 allocates the first buffer area in the first backend buffer 35 on the first backend board 3 connected to the data drive 14 for staging old data from the data drive 14 to the cache memory 42 (S9411).

Next, the processor 44 stages the old data from the data drive 14 to the cache memory 42 (S9412). Then, the processor 44 frees the allocated first buffer area (S9413).

Next, the processor 44 allocates the second buffer area in the second backend buffer 35 on the second backend board 3 connected to the parity drive 14 for staging the old parity from the parity drive 14 to the cache memory 42 (S9414). The processor 44 stages the old parity from the parity drive 14 to the cache memory 42 (S9415). The processor 44 frees the allocated second buffer area (S9416).

Next, the processor 44 generates a new parity from the old data, the old parity, and the new data in the cache memory 42 using the parity generator 36 (S9417). Specifically, the processor 44 creates transfer commands to instruct the parity generator 36 to generate and write a new parity after retrieving the old data, the old parity, and the new data, and sends the transfer command to the parity generator 36.

Next, the processor 44 allocates the third buffer area in the first backend buffer 35 on the first backend board 3 connected to the data drive 14 for destaging the new data from the cache memory 42 to the data drive 14 (S9418). The processor 44 destages the new data from the cache memory 42 to the data drive 14 (S9419). The processor 44 frees the allocated third buffer area (S9420).

Next, the processor 44 allocates the fourth buffer area in the second backend buffer 35 on the second backend board 3 connected to the parity drive 14 for destaging the new parity from the cache memory 42 to the parity drive 14 (S9421). The processor 44 destages the new parity from the cache memory 42 to the parity drive 14 (S9422). The processor 44 frees the allocated fourth buffer area (S9423). Then, the processor 44 terminates the processing. Details of staging and destaging will be described with reference to FIGS. 31 and 32.

FIG. 29 exemplifies making a staging sequence 95 to make a transfer sequence for staging data. In this process, first, the processor 44 creates a transfer command for the drive interface LSI 31 to transfer the data from the drive 14 to the backend buffer 35 (S951).

Next, the processor 44 creates a transfer command for the backend DMA 33 to transfer the data from the backend buffer 35 to the cache memory 42 (S952). Further, the processor 44 creates a transfer sequence for executing these transfer commands in this order (S953) to terminate the processing.

FIG. 30 exemplifies making a destaging sequence 96 to create a transfer sequence for destaging data. In this process, first, the processor 44 creates a transfer command for the backend DMA 33 to transfer the data from the cache memory 42 to the backend buffer 35 (S961).

Next, the processor 44 makes a transfer command for the drive interface LSI 31 to transfer the data from the backend buffer 35 to the drive 14 (S962). The processor 44 makes a transfer sequence to execute these two transfer commands in this order (S963) to terminate the processing.

FIG. 31 exemplifies staging data to the cache memory 42 (97) used in the destaging without a transfer sequencer 34. In this process, first, the processor 44 makes a transfer command for the drive interface LSI 31 to transfer the data from the drive 14 to the backend buffer 35 (S971).

Next, the processor 44 sends the created command to the drive interface LSI 31 and instructs it to execute the transfer (S972). The processor 44 waits for a status from the drive interface LSI 31 that indicates the transfer has been complete (S973). Upon receipt of the status, the processor 44 analyzes it to check the transfer has succeeded (S974).

Then, the processor 44 makes a transfer command for the backend DMA 33 to transfer the data from the backend buffer 35 to the cache memory 42 (S975). The processor 44 sends the created command to the backend DMA 33 and instructs it to execute the transfer (S976).

The processor 44 waits for a status from the backend DMA 33 that indicates the transfer is complete (S977). Upon receipt of the status, the processor 44 analyzes it to check that the transfer has succeeded (S978). Lastly, the processor 44 terminates the processing.

FIG. 32 exemplifies data destaging to the drive 14 (98) without a transfer sequencer 34. In this process, first, the processor 44 makes a transfer command for the backend DMA 33 to transfer the data from the cache memory 42 to the backend buffer 35 (S981).

The processor 44 sends the created command to the backend DMA 33 and instructs it to execute the transfer (S982). The processor 44 waits for a status sent by the backend DMA 33 that indicates the transfer is complete (5983). Upon receipt of the status, the processor 44 analyzes it to check that the transfer has succeeded (S984).

Next, the processor 44 makes a transfer command for the drive interface LSI 31 to transfer the data from the backend buffer 35 to the drive 14 (S985). The processor 44 sends the created command to drive interface LSI 31 to instruct it to execute the transfer (S986). The processor 44 waits for a status sent by the drive interface LSI 31 that indicates the transfer is complete (S987). Upon receipt of the status, the processor 44 analyzes it to check that the transfer has succeeded (S988). Then, the processor 44 terminates the processing.

In the case of using transfer sequencers 24/34, it is unnecessary that the processor 44 intervene between the invocation of a series of transfers and the verification of the completion thereof. Accordingly, the amount of processing of the processor 44 is small so that the storage system 1 can show high performance. On the other hand, in the case of without using transfer sequencer 24/34, (areas of) buffers are allocated for a requisite time period and then freed; accordingly, the required amount of buffer area can be suppressed.

In view of these circumstances, it might be preferable not to use a transfer sequencer 24/34 in the case where the processor 44 does not have sufficient remaining processing power or the remaining buffer space is tight. In addition, in the case where a plurality of transfer commands are required for a phase of transfer, such as the case where the data to be transferred is not located in a continuous area, it is preferable not to use a transfer sequencer so that the structure of the transfer sequencers 24/34 can be simplified. Furthermore, when there are accesses to the same data, it is efficient that the processor 44 perform transfers without using a transfer sequencer 24/34 because a long exclusion from accessing the data will not be necessary.

The configuration described above achieves reduction in the amount of processing of a processor in data transfers in a storage system. As a result, the performance of the storage system improves. The transfer sequencer required in this embodiment is simple in its configuration that only performs hardware communication; resources (circuitry scale and memory capacity) that are additionally required are a little.

As set forth above, preferred embodiments of this invention have been described, but this invention is not limited to the above-described embodiments. Those skilled in the art can easily modify, add, or convert each constituent in the above embodiments within the scope of this invention. A part of the configuration of one embodiment may be replaced with the one of the other embodiment; and the configuration of one embodiment may be added to the other embodiment. A part of the configuration of each embodiment may be added, deleted, or replaced by a different configuration.

This invention can be applied to a storage system which does not include one of a drive and a cache memory. In a storage system which does not include a drive, a storage device corresponding to the cache memory in the above-described embodiments provides a final storage area of user data. Typically, such a storage system includes a plurality of power supplies and stores the user data in a plurality of storage devices in parallel to reduce the probability of data loss.

The invention claimed is:

1. A storage system transferring user data within the system, comprising:
   a first transfer engine;
   a second transfer engine;
   a first storage device;
   a second storage device;
   a processor; and
   a transfer sequencer which is a device different from the processor,
   wherein:
      the processor creates transfer sequence information for indicating sequential order of transfers of user data;
      the transfer sequence information includes identification information on a destination and a source, storage address information of the user data at the destination and the source, and information indicating sequential order of transfers of the user data;
      the transfer sequencer receives the transfer sequence information created by the processor and controls the first and the second transfer engines in accordance with the transfer sequence information;
      the first transfer engine transfers received user data to the first storage device in accordance with an instruction from the transfer sequencer;
      the first storage device stores the transferred user data;
      the second transfer engine transfers the user data in the first storage device to the second storage device in accordance with an instruction of the transfer sequencer; and
      the second storage device stores the transferred user data.

2. The storage system according to claim 1, wherein:
   the processor allocates storage areas of the first and the second storage devices before the start of the transfers in accordance with the transfer sequence information; and the processor frees the allocated storage areas after the completion of the transfers in accordance with the transfer sequence information.

3. The storage system according to claim 2, further comprising:
a second transfer sequencer;
a third transfer engine; and
a third data storage device,
wherein:
the transfer sequencer and the first and the second transfer engines are disposed on a first board;
the second transfer sequencer and the third transfer engine are disposed on a second board;
the first and the second boards are connected via an internal network;
the processor creates a second transfer sequence information for transferring the user data; and
the second transfer sequencer receives the second transfer sequence information and controls the third transfer engine in accordance with the second transfer sequence information.

4. The storage system according to claim 3, wherein:
the transfer sequencer invokes the second transfer sequencer in accordance with the transfer sequence information after the transfers of the user data in accordance with the transfer sequence information has been completed normally;
the third transfer engine transfers the user data in the second storage device to the third storage device in accordance with an instruction of the invoked second transfer sequencer; and
the third storage device stores the transferred user data.

5. The storage system according to claim 4, wherein the processor determines whether to use the transfer sequencer in internal transfers of the user data in accordance with predetermined criteria.

6. The storage system according to claim 5, wherein the processor decides nonuse of the transfer sequencer in internal transfers in which storing locations of the user data are separated in a plurality of storage devices.

7. The storage system according to claim 6, wherein the processor decides nonuse of the transfer sequencer in internal transfers in which the user data is stored in discontinuous storage areas.

8. The storage system according to claim 7, wherein the processor compares a data length of the user data to be transferred internally with a free space of at least either one of the first storage device and the second storage device to determine whether to use the transfer sequencer.

9. The storage system according to claim 8, wherein the processor decides nonuse of the transfer sequencer in internal transfers of the user data to which accesses by a plurality of processes are present.

10. The storage system according to claim 9, wherein the processor determines whether to use the transfer sequencer with reference to a load to the processor and/or a load to the transfer sequencer.

11. The storage system according to claim 1, wherein:
the transfer sequencer notifies each of the first and the second transfer engines of the storage address information of the user data at the destination and the source and the data length of the user data;
the transfer sequencer receives a status indicating a normal completion/abnormal completion of a transfer from each of the first and the second transfer engines; and
the transfer sequencer invokes a next data transfer in a case where the received status indicates a normal completion.

12. The storage system according to claim 11, wherein:
the transfer sequencer includes an embedded processor; and
an operating frequency of the embedded processor is lower than an operating frequency of the processor.

* * * * *